US012706115B2

(12) United States Patent
Shimoda

(10) Patent No.: US 12,706,115 B2
(45) Date of Patent: Aug. 11, 2026

(54) TEMPERATURE MEASURING UNIT, DISK DRIVE SUSPENSION MANUFACTURING APPARATUS, AND DISK DRIVE SUSPENSION MANUFACTURING METHOD

(71) Applicant: NHK SPRING CO., LTD., Yokohama (JP)

(72) Inventor: Takeshi Shimoda, Yokohama (JP)

(73) Assignee: NHK SPRING CO., LTD., Kanagawa (JP)

(*) Notice: Subject to any disclaimer, the term of this patent is extended or adjusted under 35 U.S.C. 154(b) by 446 days.

(21) Appl. No.: 18/340,033

(22) Filed: Jun. 23, 2023

(65) Prior Publication Data

US 2023/0417605 A1 Dec. 28, 2023

(30) Foreign Application Priority Data

Jun. 23, 2022 (JP) ................................ 2022-101146

(51) Int. Cl.

*G11B 33/14* (2006.01)
*G01K 1/14* (2021.01)
*G01K 7/02* (2021.01)
*G01K 13/00* (2021.01)
*G11B 5/48* (2006.01)
*G11B 5/55* (2006.01)

(52) U.S. Cl.

CPC .............. *G11B 5/5565* (2013.01); *G01K 1/14* (2013.01); *G01K 7/02* (2013.01); *G01K 13/00* (2013.01); *G11B 33/144* (2013.01); *G11B 5/483* (2015.09); *Y10T 29/49025* (2015.01)

(58) Field of Classification Search

None
See application file for complete search history.

(56) References Cited

U.S. PATENT DOCUMENTS 5,934,183 A * 8/1999 Schlosser et al. .. A47J 37/0713 126/25 R
6,433,310 B1 * 8/2002 Wickramasinghe et al. ................ G11B 9/14 369/127
6,757,235 B2 * 6/2004 Wickramasinghe et al. ................ G11B 9/14 369/126
10,923,160 B2 * 2/2021 Castaneda et al. .. G11B 33/144
2019/0376851 A1 * 12/2019 Masaki et al. ........... G01K 1/14

FOREIGN PATENT DOCUMENTS

JP 3194388 U 11/2014
JP 5756987 B2 7/2015

* cited by examiner

*Primary Examiner* — Craig A. Renner
(74) *Attorney, Agent, or Firm* — Holtz, Holtz & Volek PC

(57) ABSTRACT

A temperature measuring unit includes a base including a first face, a second face on a side opposite to the first face, and a first opening portion penetrating the first face and the second face, a support member including a body portion provided on the second face side to overlap with the first opening portion, and a plurality of extending portions extending from the body portion along the second face and overlapping with the second face, and a thermocouple inserted into the first opening portion and including a measuring portion located on the body portion.

10 Claims, 16 Drawing Sheets

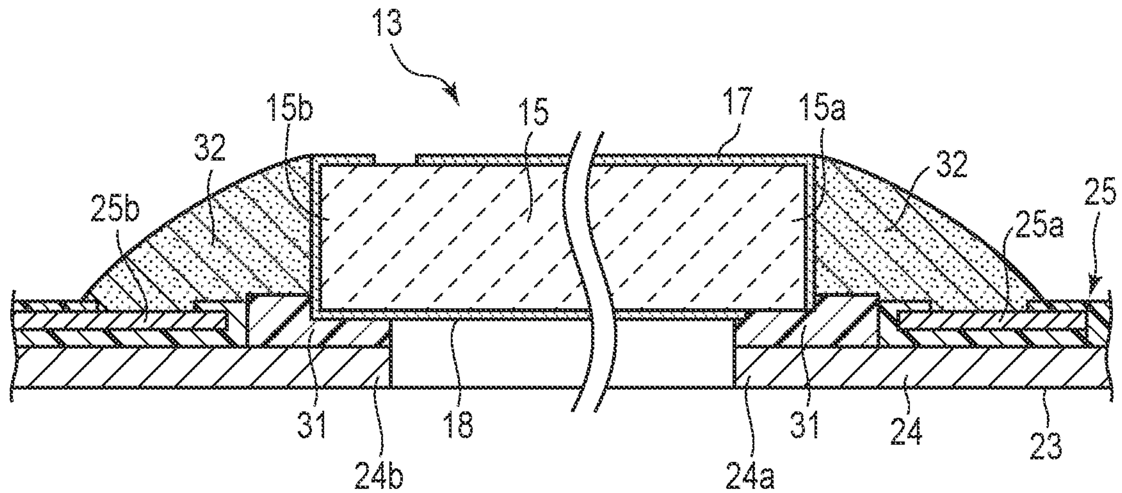
F I G. 5

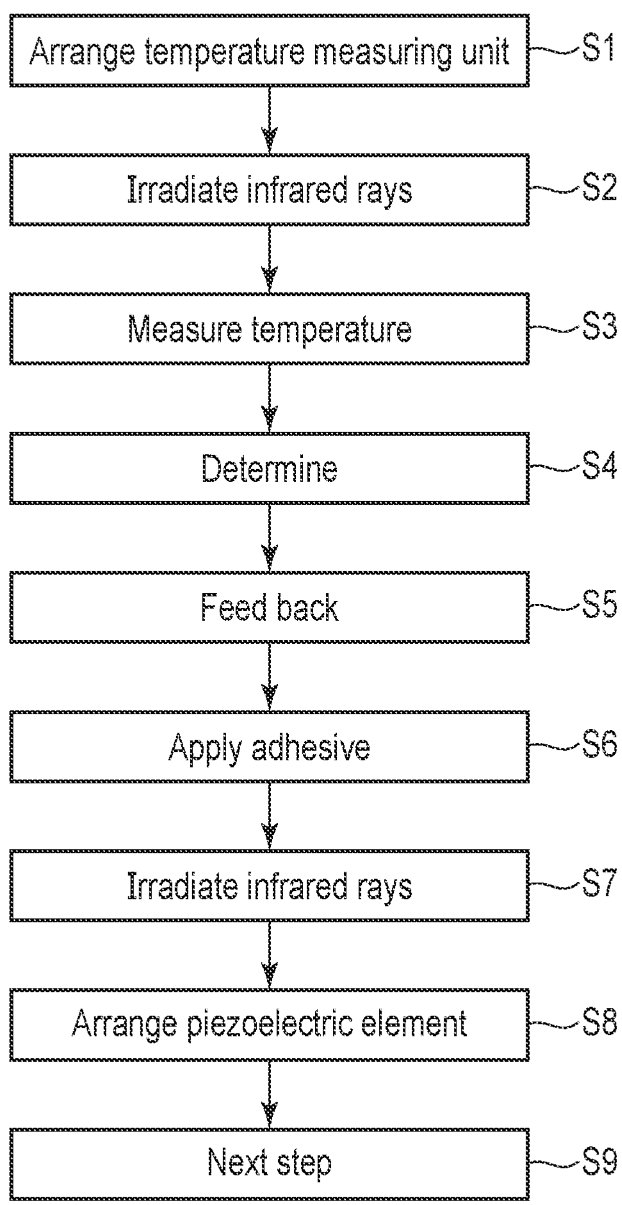
F I G. 7

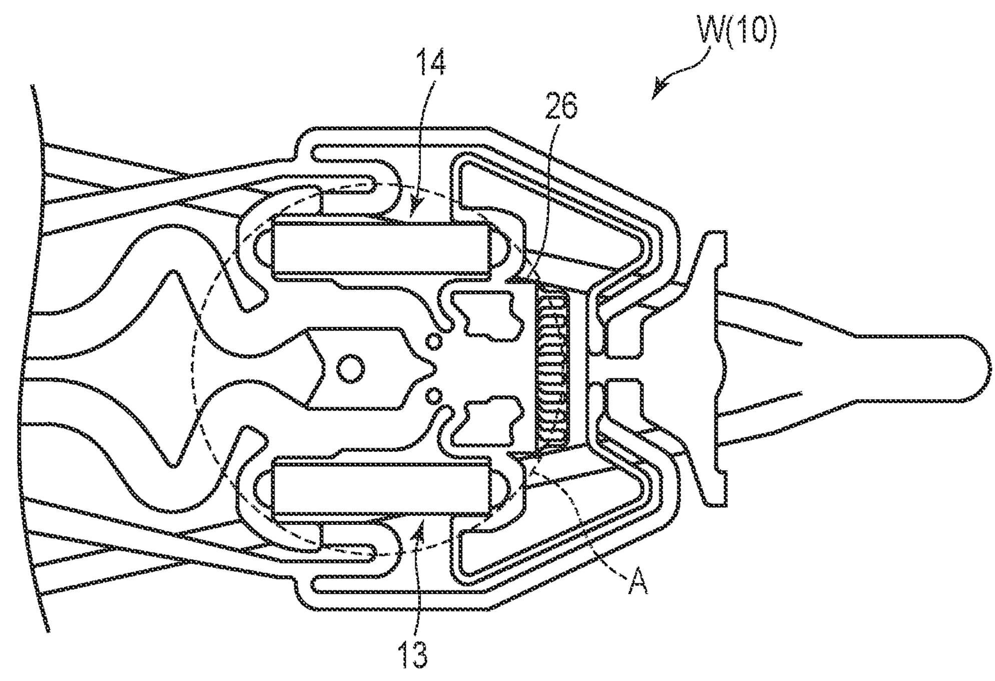
F I G. 11
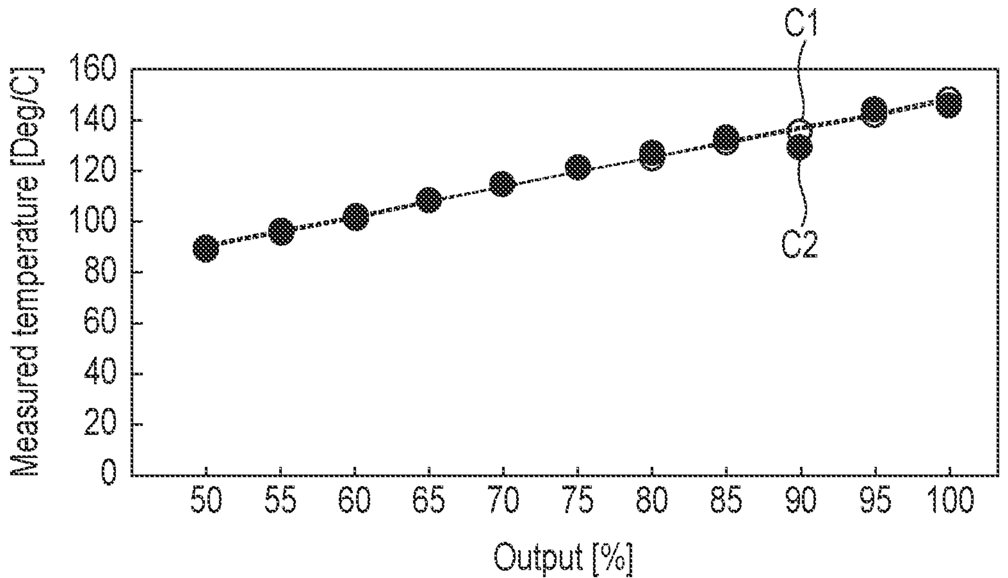
F I G. 12

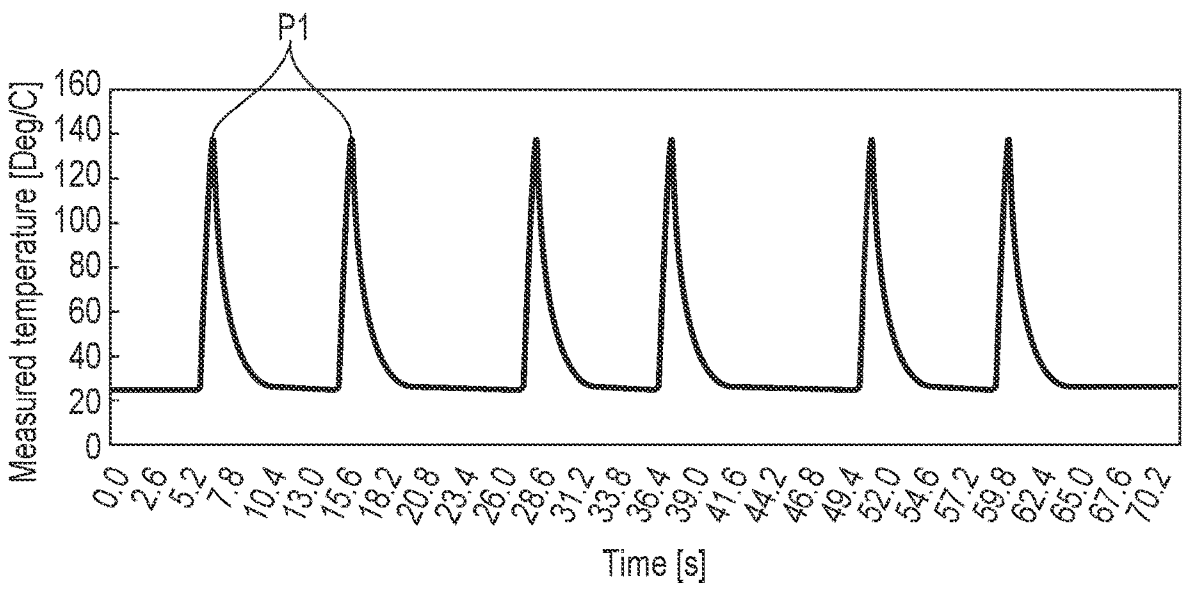
F I G. 13
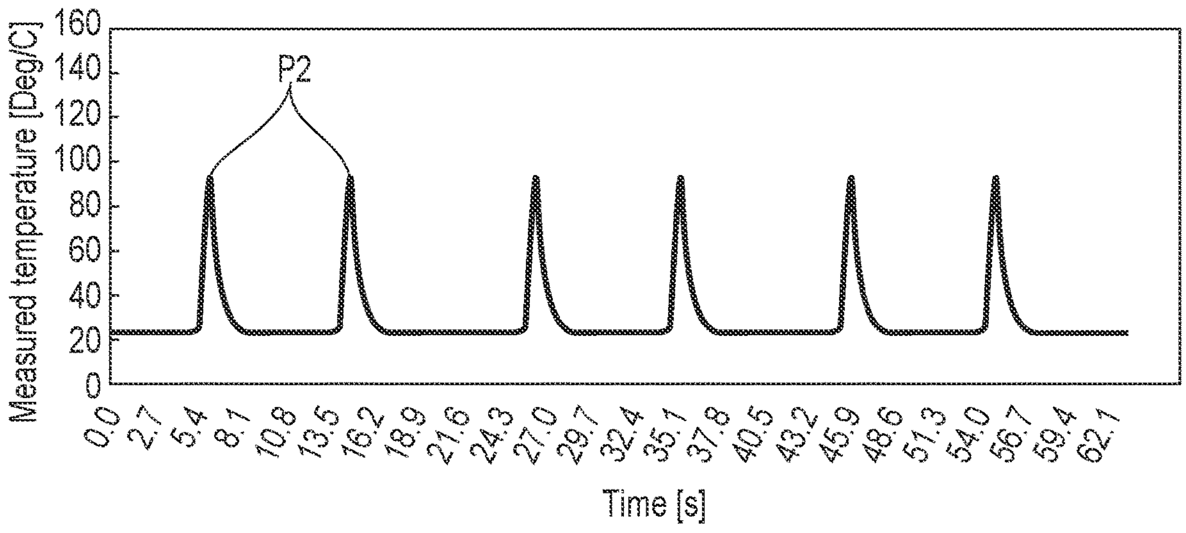
F I G. 14

TEMPERATURE MEASURING UNIT, DISK DRIVE SUSPENSION MANUFACTURING APPARATUS, AND DISK DRIVE SUSPENSION MANUFACTURING METHOD

CROSS-REFERENCE TO RELATED APPLICATIONS

This application is based upon and claims the benefit of priority from prior Japanese Patent Application No. 2022-101146, filed Jun. 23, 2022, the entire contents of which are incorporated herein by reference.

BACKGROUND OF THE INVENTION

1. Field of the Invention

The present invention relates to a temperature measuring unit, a disk drive suspension manufacturing apparatus, and a disk drive suspension manufacturing method.

2. Description of the Related Art

A hard disk drive (HDD) is used in an information processing apparatus such as a personal computer. The hard disk drive includes a magnetic disk which rotates about a spindle, a carriage which turns about a pivot, and the like. The carriage includes an arm, and swivels in a disk track width direction about the pivot by a positioning motor such as a voice coil motor.

A disk drive suspension (hereinafter simply referred to as a suspension) is attached to the arm. The suspension includes a load beam, a flexure overlapping with the load beam, and the like. A slider which constitutes a magnetic head is provided on a gimbal portion formed near a distal end of the flexure. An element (transducer) for access to data such as reading or writing of data is provided on the slider. A head gimbal assembly is constituted by the load beam, the flexure, the slider, and the like.

In order to respond to the increase in the recording density of the disks, the head gimbal assembly needs to be further downsized, and the slider needs to be positioned more accurately relative to the recording surface of the disks. A suspension comprising a piezoelectric element that functions as an actuator in addition to a positioning motor (voice coil motor) for the purpose of improving the accuracy in positioning of the magnetic head, is known.

For example, a thermosetting adhesive is used to fix the piezoelectric element. The adhesive is heated and cured by, for example, irradiation of infrared rays. Since irradiated infrared rays affect the performance of the suspension, the irradiated infrared rays need to be strictly controlled. Temperature measurement is performed using temperature sensors such as thermocouples for the purpose of controlling the irradiated infrared rays. Various proposals have been conventionally made for temperature measurement using thermocouples.

For example, JP 3194388 U discloses an infrared heater comprising a heating element that generates heat by passage of electric current and emits infrared rays, an insulating support member that supports the heating element, and a thermocouple including a first metal wire and a second metal wire which are separated from the heating element and which have different material compositions, wherein a temperature measuring unit formed by joining the first metal wire and the second metal wire is arranged in a space sandwiched between the heating element and the support member.

For example, JP 5756987 B discloses a thermocouple for surface temperature measurement, characterized in that a distal portion including a tip for sensing temperature is shaped in a flexible thin plate or thin wire and is bent at a predetermined angle.

Considering the infrared heater disclosed in JP 3194388 U and the thermocouple for surface temperature measurement disclosed in JP 5756987 B, there is still room for various improvements regarding the temperature measurement using thermocouples.

BRIEF SUMMARY OF THE INVENTION

One of the purposes of the present invention is to provide a temperature measuring unit capable of measuring temperatures using thermocouples with high accuracy, a disk drive suspension manufacturing apparatus, and a disk drive suspension manufacturing method.

In general, according to one embodiment, a temperature measuring unit comprises a base including a first face, a second face on a side opposite to the first face, and a first opening portion penetrating the first face and the second face, a support member including a body portion provided on the second face side to overlap with the first opening portion, and a plurality of extending portions extending from the body portion along the second face and overlapping with the second face, and a thermocouple inserted into the first opening portion and including a measuring portion located on the body portion.

The support member may include a second opening portion overlapping with a center of the first opening portion and penetrating the body portion, and the measuring portion may be located in the second opening portion. The extending portion may include a proximal portion connected to the body portion, and a distal end portion overlapping with the second face and having a width smaller than a width of the proximal portion.

The support member further may include a fixed portion connected to the distal end portion, overlapping with the second face, and having a width greater than the distal end portion.

The support member further may include a frame portion connected to the plurality of extending portions and overlapping with the second face. The temperature measuring unit further may comprise adhesives bonding the base with the support member. The support member further may include a plurality of third opening portions overlapping with the second face and penetrating the support member, and the adhesives may be located in the third opening portions.

According to another embodiment, a disk drive suspension manufacturing apparatus is an apparatus for manufacturing a disk drive suspension comprising an actuator mounted portion on which a piezoelectric element is mounted, and the apparatus comprises a coating device applying an adhesive to the actuator mounted portion, an infrared irradiation device heating the adhesive by irradiating infrared rays to the applied adhesive, the temperature measuring unit which measures a temperature at an irradiation position of the infrared rays, and a control device adjusting irradiation conditions of the infrared rays, based on a temperature measured by the temperature measuring unit.

The disk drive suspension may include a metal base located on the actuator mounted portion, and a material for forming the support member may be the same as a material for forming the metal base. The disk drive suspension may include a metal base located on the actuator mounted portion, and a thickness of the support member may be equal to a thickness of the metal base.

According to yet another embodiment, a disk drive suspension manufacturing method is a method of manufacturing a disk drive suspension comprising an actuator mounted portion on which a piezoelectric element is mounted, and the method comprises arranging the temperature measuring unit, at an irradiation position of the infrared rays irradiated to the adhesive applied to the actuator mounted portion, irradiating the infrared rays to the temperature measuring unit, measuring a temperature at the irradiation position by the temperature measuring unit, adjusting irradiation conditions of the infrared rays, based on the temperature measured by the temperature measuring unit, applying the adhesive to the actuator mounted portion; and irradiating the infrared rays to the adhesive applied to the actuator mounted portion.

According to the temperature measuring unit, the disk drive suspension manufacturing apparatus, and the disk drive suspension manufacturing method, which are configured as described above, temperature measurement using the thermocouple can be executed with good accuracy.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a schematic cross-sectional view showing a first actuator mounted portion shown in FIG. 4.

FIG. 7 is a flowchart showing an example of a method of manufacturing one suspension shown in FIG. 3.

FIG. 11 is a view illustrating a relationship between actuator mounted portions of the workpiece and an infrared irradiation area.

FIG. 12 is a graph showing a measured temperature at each output of the infrared irradiation device.

FIG. 13 is a graph showing a relationship between the time and the measured temperatures.

FIG. 14 is a graph showing a relationship between the time and the measured temperatures.

DETAILED DESCRIPTION OF THE INVENTION

Figure 1:
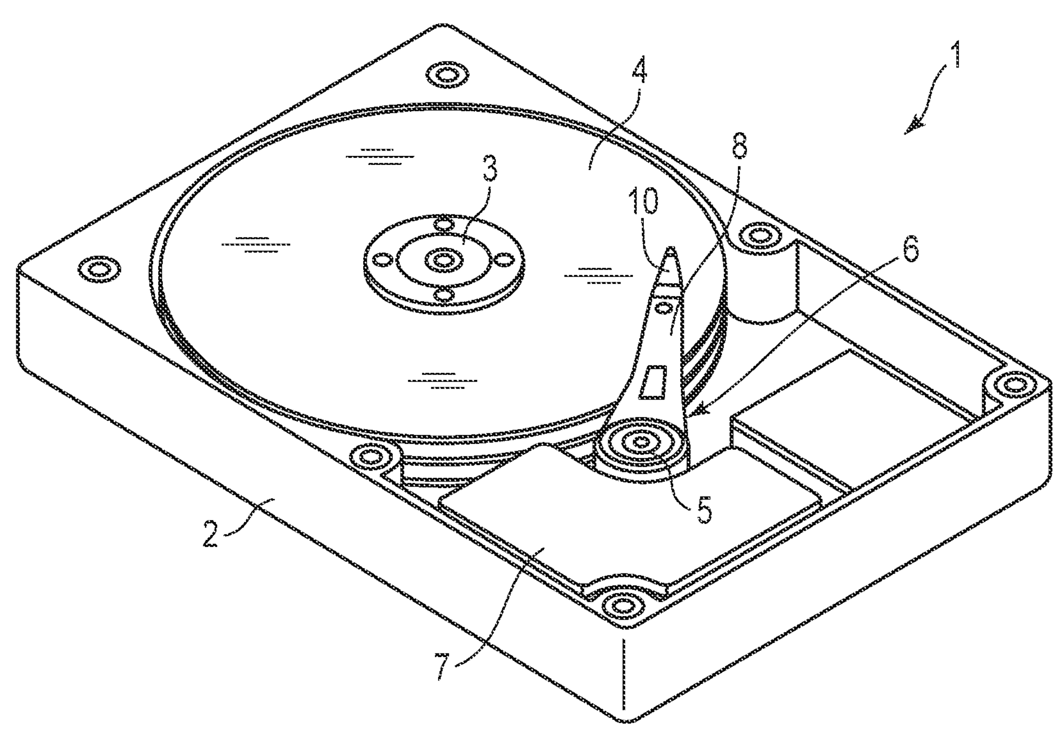
FIG. 1 is a schematic perspective view showing an example of a disk drive.

Each of embodiments of the invention will be described hereinafter with reference to the accompanying drawings. In order to make the description clearer, the sizes, shapes and the like of the respective parts may be changed and illustrated schematically in the drawings as compared with those in an accurate representation.

First Embodiment

FIG. 1 is a schematic perspective view showing an example of a disk drive (HDD) 1. The disk drive 1 comprises a casing 2, a plurality of disks 4 rotating about a spindle 3, a carriage 6 which can turn about a pivot 5, a positioning motor (voice coil motor) 7 for driving the carriage 6, and the like. The casing 2 is sealed by a lid (not shown).

Figure 2:
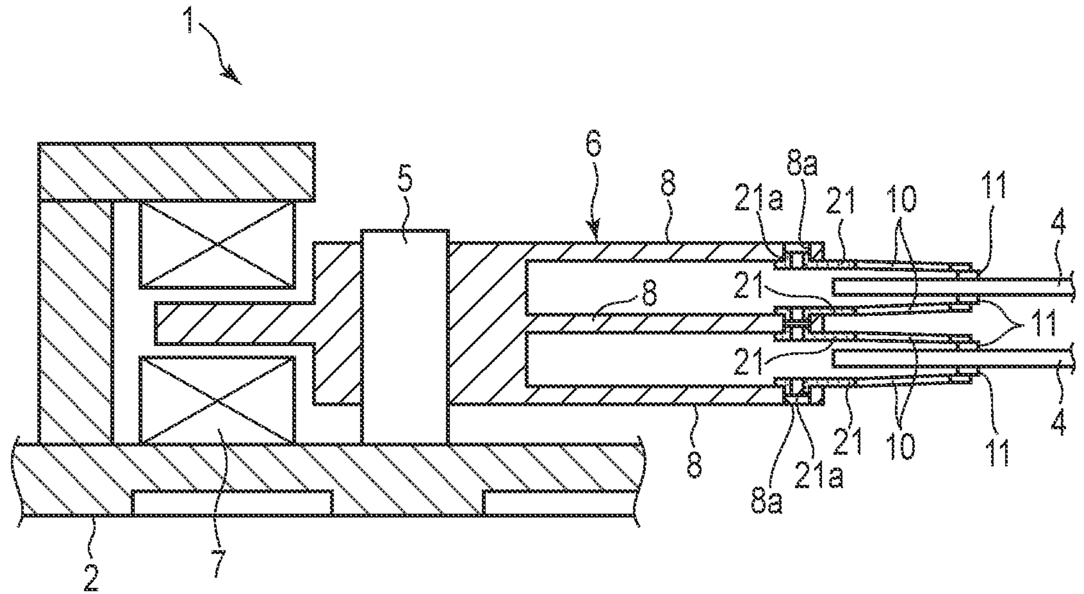
FIG. 2 is a schematic cross-sectional view showing a part of the disk drive.

FIG. 2 is a schematic cross-sectional view showing a part of the disk drive 1. As shown in FIG. 1 and FIG. 2, a plurality of (for example, three) arms (carriage arms) 8 are provided on the carriage 6.

A disk drive suspension (hereinafter simply referred to as a suspension) 10 is mounted on a distal end portion of each of the arms 8. A slider 11 which constitutes the magnetic head is provided on the distal end portion of each of the suspensions 10. When each disk 4 is rotated at a high speed, air flows in between the disk 4 and the slider 11 and an air bearing is thereby formed.

The suspension 10 comprises a base plate 21. A boss portion **21*a* to be inserted into a hole 8*a* formed in each arm 8 is formed on the baseplate 20. When the carriage 6 is turned by the positioning motor 7, the suspension 10 moves in a radial direction of the disk 4, and the slider 11 thereby moves to a desired track of the disk 4**.

Figure 3:
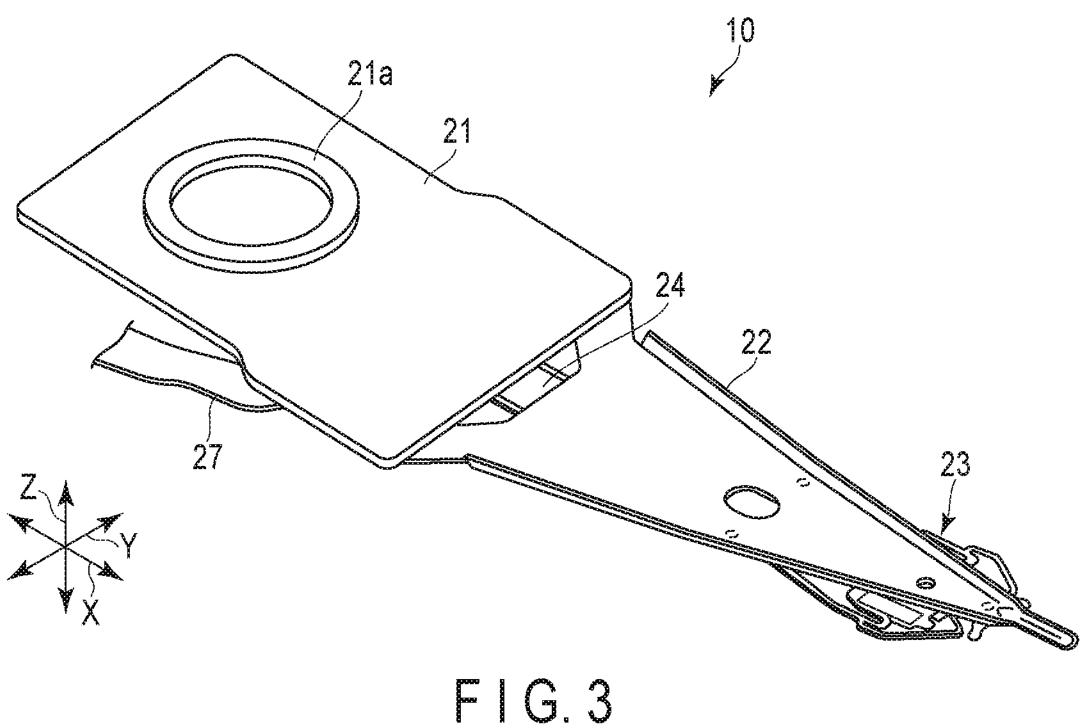
FIG. 3 is a schematic perspective view showing an example of a suspension provided in the disk drive.
Figure 4:
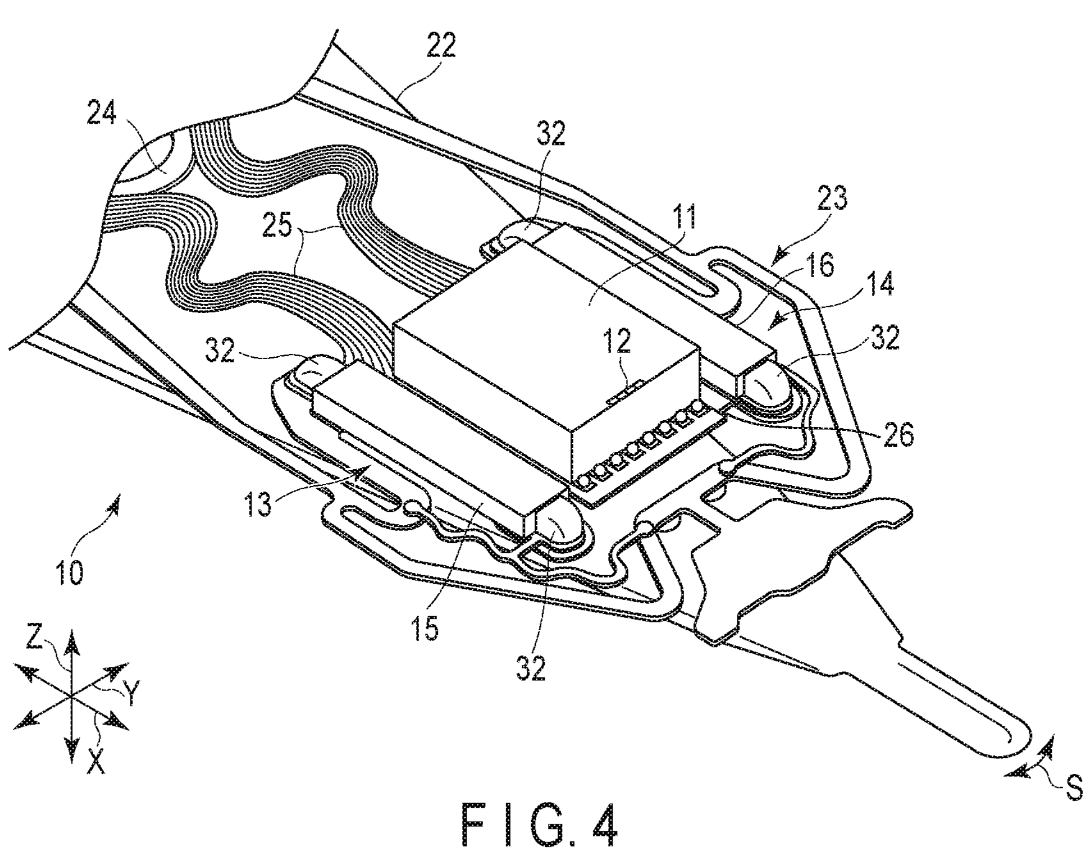
FIG. 4 is a schematic perspective view showing a part of a distal side of the suspension in FIG. 3 as seen from a slider side.

FIG. 3 is a schematic perspective view showing an example of the suspension 10 provided in the disk drive. FIG. 4 is a schematic perspective view showing a part of a distal side of the suspension 10 in FIG. 3 as seen from a slider side.

The suspension 10 comprises the above-described base plate 21, a load beam 22, and a flexure 23. Both the load beam 22 and the flexure 23 extend in the longitudinal direction of the suspension 10.

The longitudinal direction of the suspension 10, the base plate 21, the load beam 22, and the flexure 23 is hereinafter defined as a longitudinal direction X. A direction orthogonal to the longitudinal direction X is defined as a width direction Y of the suspension 10, the base plate 21, the load beam 22, and the flexure 23.

A direction intersecting (for example, orthogonal to) the longitudinal direction X and the width direction Y of the suspension 10, the load beam 22, the flexure 30, and the like is defined as a thickness direction Z. Furthermore, as shown in FIG. 4, a sway direction S is defined as indicated by an arc-shaped arrow near the distal end of the load beam 22.

As shown in FIG. 3, one end side of the load beam 22 overlaps with the base plate 21. The flexure 23 is arranged along the load beam 22. As shown in FIG. 3 and FIG. 4, the flexure 23 comprises a metal base 24 formed of, for example, stainless steel and a wiring portion 25 formed on the metal base 24. A part of the wiring portion 25 is connected to the slider 11.

A thickness of the metal base 24 is smaller than a thickness of the load beam 22. The thickness of the metal base 24 is 12 to 25 μm, for example, 20 μm. The thickness of the load beam 22 is, for example, 30 μm.

The flexure 23 has a tongue 26 which functions as a gimbal portion, in the vicinity of the distal end portion of the load beam 22. A slider 11 forming the magnetic head is arranged on the tongue 26. The tongue 26 is part of the metal base 24 and is formed by, for example, etching.

As shown in FIG. 4, for example, elements 12 capable of converting magnetic signals and electrical signals, such as an MR element, are provided at the distal end portion of the slider 11. Access such as data write, data read, or the like on the disks 4 (shown in FIG. 1 and FIG. 2) is performed by the elements 12.

A head gimbal assembly is composed of the slider 11, the load beam 22, the flexure 23, and the like. As shown in FIG. 3, a tail portion 27 of the flexure 23 extends behind the base plate 21.

As shown in FIG. 4, the suspension 10 further comprises a pair of actuator mounted portions 13 and 14 and a pair of piezoelectric elements 15 and 16. The pair of actuator mounted portions 13 and 14 is arranged at the distal end portion of the suspension 10.

The first actuator mounted portion 13 on which the piezoelectric element 15 is mounted is arranged on one side of the slider 11 in the width direction Y. The second actuator mounted portion 14 on which the piezoelectric element 16 is mounted is arranged on the other side of the slider 11 in the width direction Y.

The piezoelectric elements 15 and 16 function as actuators. The piezoelectric elements 15 and 16 are formed of piezoelectric materials such as lead zirconate titanate (PZT). The piezoelectric elements 15 and 16 can be deformed and the tongue 26 can be thereby rotated in the sway direction S in response to an applied voltage.

FIG. 5 is a schematic cross-sectional view showing the first actuator mounted portion 13 shown in FIG. 4. The second actuator mounted portion 14 is configured substantially similarly to the first actuator mounted portion 13. For this reason, the first actuator mounted portion 13 will be described below and description of the second actuator mounted portion 14 will be omitted.

The actuator mounted portion 13 is composed of the metal base 24 of the flexure 23 and the like. An end part 15*a* of the piezoelectric element 15 is fixed to a first actuator support portion 24*a* of the metal base 24 by an adhesive 31.

The other end part 15*b* of the piezoelectric element 15 is fixed to a second actuator support portion 24*b* of the metal base 24 by an adhesive 31. The adhesive 31 is electrically insulative. The adhesive 31 is, for example, a one-component thermosetting epoxy adhesive.

A first electrode 17 of the piezoelectric element 15 is electrically conductive with a first conductor 25*a* of the first actuator mounted portion 13 via a conductive material 32. A second electrode 18 of the piezoelectric element 15 is electrically conductive with a second conductor 25*b* of the first actuator mounted portion 13 via a conductive material 32. The conductive material 32 is, for example, a conductive adhesive.

Next, manufacturing of the suspension 10 will be described.

Figure 6:
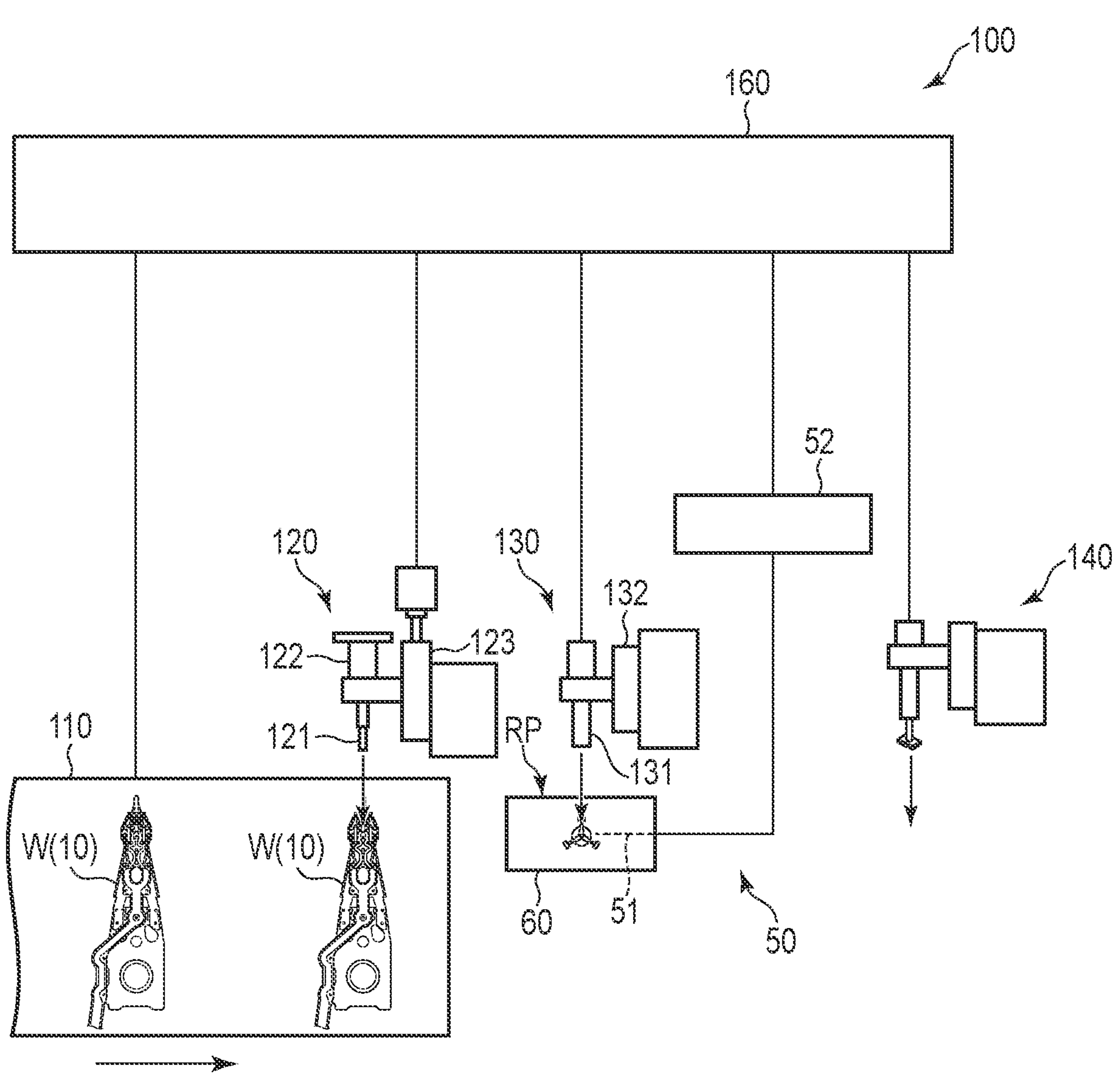
FIG. 6 is a view showing a schematic configuration of a manufacturing apparatus of a suspension according to a first embodiment.

FIG. 6 is a view showing a schematic configuration of the manufacturing apparatus 100 of the suspension 10 according to the present embodiment. The manufacturing apparatus 100 comprises a transport device 110, a coating device 120, an infrared irradiation device 130, an element supply device 140, a temperature measuring unit 50, and a control device 160.

The transport device 110 is controlled by the control device 160 and transports the suspension 10 in the process of manufacturing, which is placed on a stage, toward the coating device 120, the infrared irradiation device 130, and the element supply device 140. The suspension 10 in the process of manufacturing is often hereinafter referred to as a workpiece W.

The coating device 120 is controlled by the control device 160. The coating device 120 applies an adhesive to the actuator mounted portions 13 and 14 (shown in FIG. 4) of the workpiece W. The coating device 120 comprises a dispenser 122 including a nozzle 121 and a moving mechanism 123 which moves the dispenser 122 to control the position of the nozzle 121.

An uncured (liquid) adhesive is dispensed from the nozzle 121. The above-described adhesive 31 is formed by curing this adhesive. The coating device 120 may further include an adhesive supply source (not shown) and the like.

The infrared irradiation device 130 is controlled by the control device 160. The infrared irradiation device 130 irradiates infrared rays onto the adhesive applied to the actuator mounted portions 13 and 14 of the workpiece W which is transported to an infrared irradiation position RP. The applied adhesive is heated by the irradiated infrared rays.

The infrared irradiation device 130 comprises an irradiation head 131 that irradiates infrared rays and a moving mechanism 132 that controls the position of the irradiation head 131. The position of the irradiation head 131 can be adjusted by the moving mechanism 132.

The element supply device 140 is controlled by the control unit 160. The element supply device 140 arranges the piezoelectric elements 15 and 16 (shown in FIG. 4) on the adhesives applied to the actuator mounted portions 13 and 14, respectively.

The applied adhesive is, for example, heated by the infrared irradiation device 130 and has increased viscosity. In this case, movement of the piezoelectric elements 15 and 16 arranged on the adhesives from predetermined positions is suppressed due to surface tension of the adhesives. The applied adhesives may be heated by the infrared irradiation device 130 only after the piezoelectric elements 15 and 16 are arranged.

The temperature measuring unit 50 measures the temperature at the irradiation position RP of the infrared rays irradiated from the infrared irradiation device 130. In the example shown in FIG. 6, the temperature measuring unit 50 is located at the infrared irradiation position RP. The temperature measuring unit 50 comprises a thermocouple unit 60 including a thermocouple 51, and a measuring module 52 connected to the thermocouple 51.

The control device 160 controls various elements provided in the manufacturing apparatus 100, such as the transport device 110, the coating device 120, the infrared irradiation device 130, the element supply unit 140, and the temperature measuring unit 50. The control device 160 comprises a memory that stores computer programs and data to realize operations related to the control and inspection of these elements, and a processor that executes these programs.

For example, the control device 160 adjusts the inspection and the infrared irradiation conditions of the infrared irradiation device 130, based on the temperature measured by the temperature measuring unit 50. The manufacturing apparatus 100 may further comprise a conductive material supply device, and a heating device, and the like (not shown).

Next, an example of a manufacturing method of mounting the piezoelectric elements 15 and 16 on the actuator mounted portions 13 and 14 will be described. FIG. 7 is a flowchart showing an example of a method of manufacturing one suspension 10 shown in FIG. 3.

A manufacturing process using the transport device 110, the coating device 120, the infrared irradiation device 130, the element supply device 140, and the temperature measuring unit 50 will be focused, and detailed descriptions of the other processes will be omitted. For example, temperature measurement using the temperature measuring unit 50 is performed before starting the operation of the infrared irradiation device 130. The temperature measurement using the temperature measuring unit 50 may also be performed during maintenance or daily inspection of the infrared irradiation device 130.

In the flowchart of FIG. 7, the thermocouple unit 60 of the temperature measuring unit 50 is first arranged at the infrared irradiation position RP (shown in FIG. 6) (step S1). The thermocouple unit 60 may be arranged by a device (not shown) controlled by the control device 160 or by an operator.

Subsequently, infrared rays are irradiated from the infrared irradiation device 130 toward the thermocouple unit 60 arranged at the irradiation position RP (step S2). Subsequently, the temperature at the irradiation position RP is measured by the temperature measuring unit 50 (step S3).

In the present embodiment, when infrared rays are irradiated from the infrared irradiation device 130, the measuring module 52 measures the temperature via the thermocouple 51. The measured temperature data is output from the measuring module 52 to the control device 160.

Then, it is determined by the control device 160 whether the infrared irradiation conditions of the infrared irradiation device 130 are appropriate, based on the temperature measured in step S3 (step S4). For example, the control device 160 determines that the infrared irradiation conditions are appropriate if the measured temperature is within a predefined numerical value range, and determines that the infrared irradiation conditions are not appropriate if the measured temperature is out of the numerical value range.

Then, if it is determined by the determination in step S4 that the infrared irradiation conditions are not appropriate, the control device 160 executes feedback to adjust the control parameters related to the infrared irradiation device 130 such that the infrared irradiation conditions are appropriate (step S5).

For example, the control parameters are the position of the irradiation head 131, the output of infrared rays, the irradiation time of infrared rays, and the like. If it is determined by the determination in step S4 that the infrared irradiation conditions are appropriate, the control device 160 does not adjust the control parameters related to the infrared irradiation device 130.

Next, the workpiece W is transported to a coating position directly opposite to the nozzle 121 of the coating device 120, by the transport device 110, and the adhesive is applied to the actuator mounted portions 13 and 14 by the coating device 120 (step S6). The transported workpiece W has undergone an upstream operation including assembly of the base plate 21 with the load beam 22.

Subsequently, the workpiece W is transported to the irradiation position RP by the transport device 110, and infrared rays are irradiated to the adhesives applied to the actuator mounted portions 13 and 14 of the workpiece W by the infrared irradiation device 130 (step S7).

Then, the piezoelectric elements 15 and 16 are arranged on the adhesives applied to the actuator mounted portions 13 and 14 by the element supply device 140 (step S8). After that, the suspension 10 is subjected to various processes necessary to complete the suspension 10 (step S9).

The piezoelectric elements 15 and 16 are mounted on the actuator mounted portions 13 and 14 through each of the above manufacturing steps. After the control parameters of the infrared irradiation device 130 are adjusted in step S5, step S2 and the following steps may be executed again to determine whether the infrared irradiation conditions are appropriate. In addition, the infrared irradiation of the applied adhesives may be performed after the piezoelectric elements 15 and 16 are arranged.

Subsequently, the temperature measuring unit 50 of the present embodiment will be described.

Figure 8:
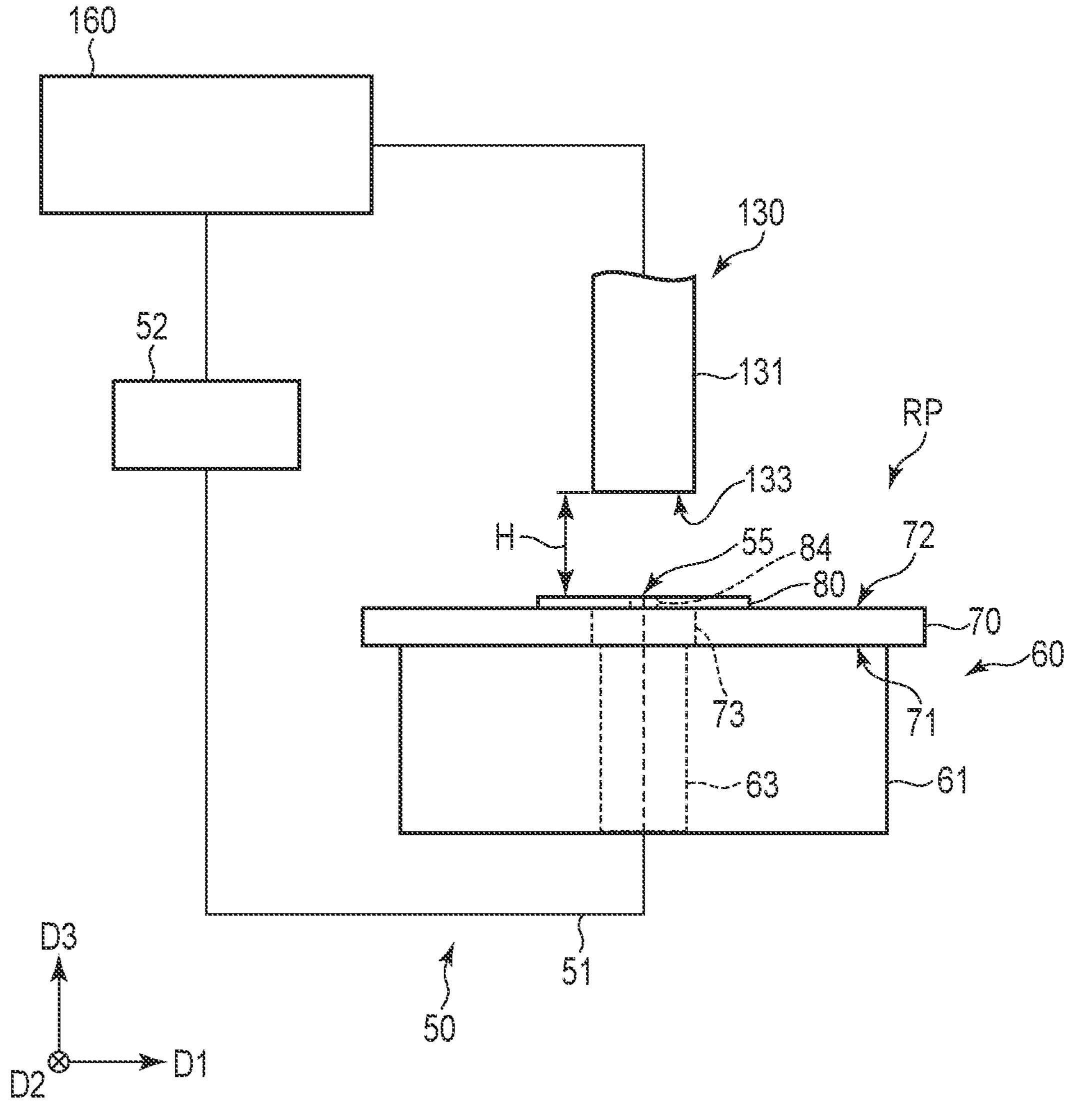
FIG. 8 is a side view schematically showing a temperature measuring unit and an infrared irradiation device.
Figure 9:
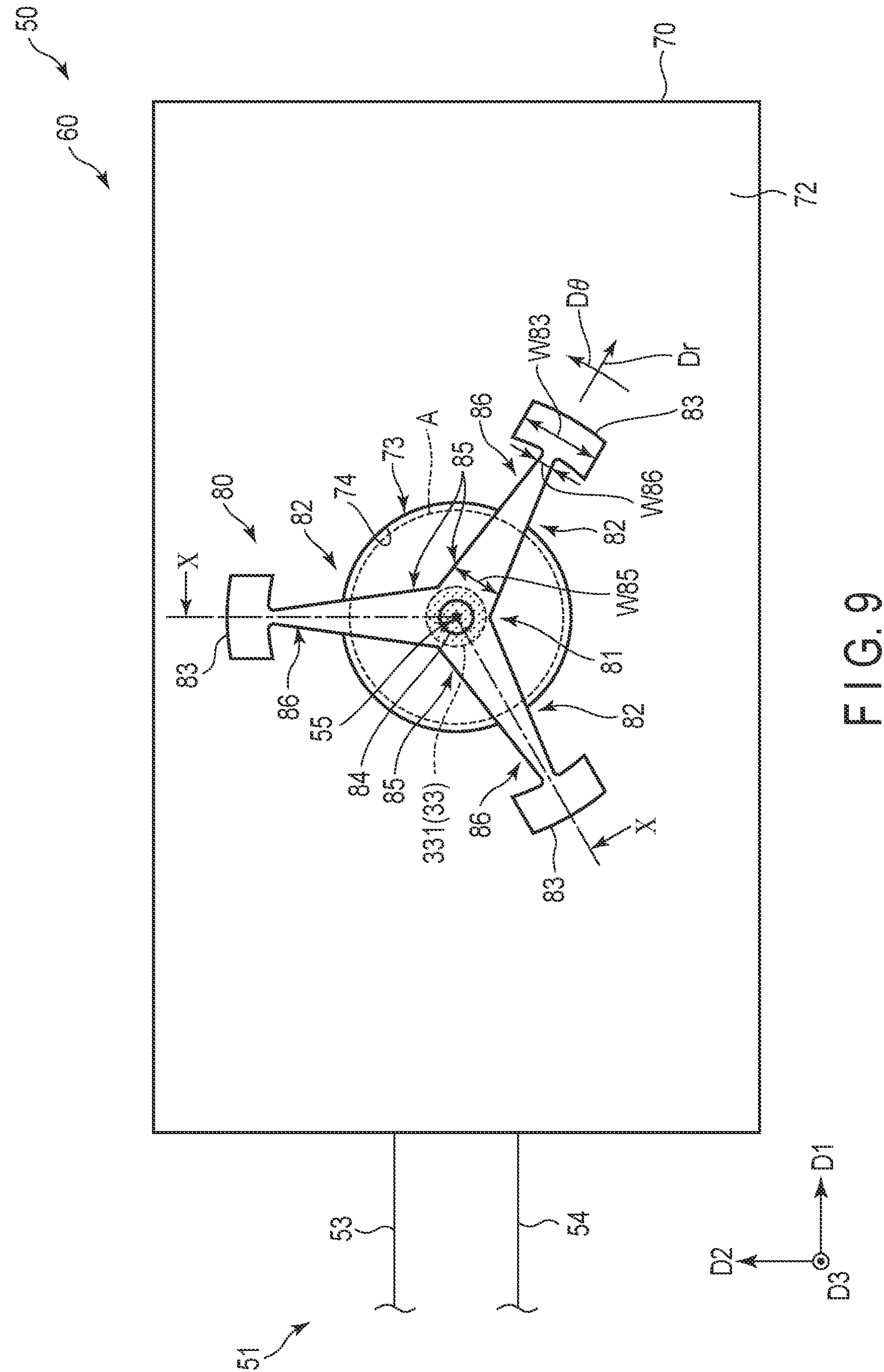
FIG. 9 is a schematic plan view showing the temperature measuring unit shown in FIG. 8.
Figure 10:
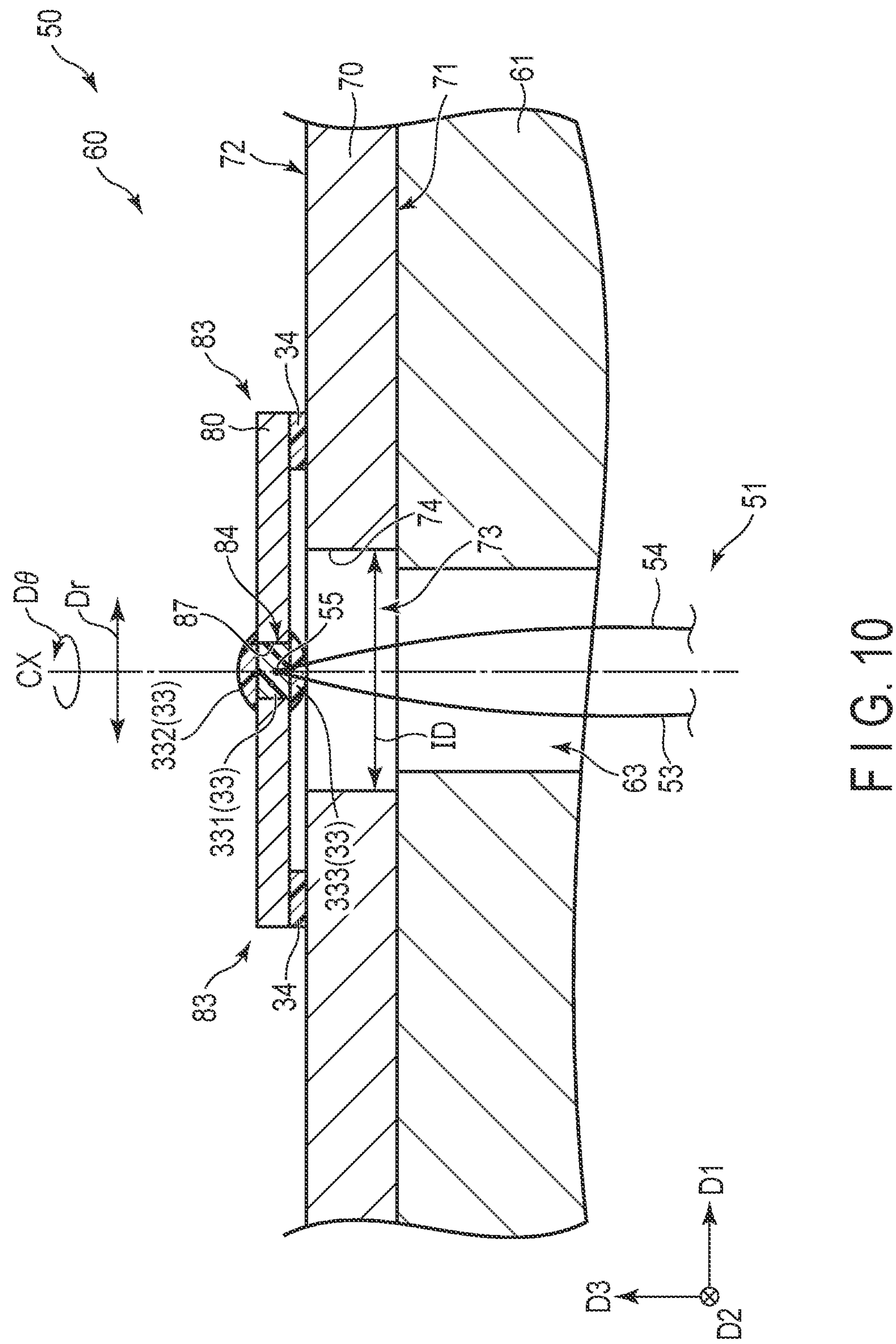
FIG. 10 is a schematic cross-sectional view showing a part of the temperature measuring unit along line X-X shown in FIG. 9.

FIG. 8 is a side view schematically showing the temperature measuring unit 50 and the infrared irradiation device 130. FIG. 9 is a schematic plan view showing the temperature measuring unit 50 shown in FIG. 8. FIG. 10 is a schematic cross-sectional view showing a part of the temperature measuring unit 50 along line X-X shown in FIG. 9. In FIG. 8, the thermocouple unit 60 is arranged at the irradiation position RP of the infrared irradiation device 130. In FIG. 9 and FIG. 10, the measurement module 52 is omitted.

As described above, the temperature measuring unit 50 comprises the thermocouple unit 60 and the measuring module 52. As shown in FIG. 8, the thermocouple unit 60 comprises a fixing stand 61, a base 70, a support member 80, and the thermocouple 51. A first direction D1, a second direction D2, and a third direction D3 of the temperature measuring unit 50 are defined below as shown in FIG. 8 through FIG. 10. These directions are directions orthogonal to each other.

The third direction D3 corresponds to a direction in which the fixing stand 61, the base 70, and the support member 80 overlap. A direction indicated by an arrow in the third direction D3 may be referred to as a direction above the thermocouple unit 60, and its opposite direction may be referred to as a direction below the thermocouple unit 60.

Viewing a plane defined by the first direction D1 and the second direction D2 may be referred to as planar view.

As shown in FIG. 8, the fixing stand 61, the base 70, the support member 80, and the irradiation head 131 are aligned in this order along the third direction D3. The fixing stand 61 is formed of, for example, a metallic material such as an aluminum alloy. The fixing stand 61 includes an opening portion 63 into which the thermocouple 51 is inserted. The opening portion 63 penetrates the fixing stand 61 along the third direction D3.

The base 70 is fixed to the fixing stand 61. The base 70 is formed of, for example, a metallic material such as an aluminum alloy. As another example, the base 70 may be formed of an engineering plastic such as polyetheretherketone (PEEK) resin.

The base 70 is formed in a form of a flat plate. In the example shown in FIG. 9, the base 70 has a rectangular shape in planar view. For example, a length of the base 70 along the first direction D1, which is the long side, is 10 to 100 mm, and a length of the base 70 along the second direction D2, which is the short side, is 10 to 100 mm. A thickness of the base 70 is greater than a thickness of the support member 80. In this example, the thickness corresponds to the distance along the third direction D3. The thickness of the base 70 is, for example, approximately 1.5 mm to approximately 2.0 mm.

As shown in FIG. 10, the base 70 includes a first face 71 facing the fixing stand 61, a second face 72 on a side opposite to the first face 71, and an opening portion 73 (first opening portion) penetrating the first face 71 and the second face 72. The first face 71 and the second face 72 are parallel to the plane defined by the first direction D1 and the second direction D2. The opening portion 73 is circularly shaped around an axis CX extending in the third direction D3.

The opening portion 73 has an inner surface 74. The inner surface 74 has a uniform diameter in the third direction D3. The shape of the opening portion 73 may be other shapes such as a polygonal shape. As shown in FIG. 9 and FIG. 10, a direction of separating from the axis CX around the axis CX is referred to as a radial direction Dr, and a circumferential direction Dθ around the axis CX is defined.

The support member 80 is provided on the second face 72. The support member 80 is formed in a shape of a thin plate. The support member 80 is formed of, for example, a metallic material. The material forming the support member 80 is desirably the same as the metal material forming the above-described metal base 24.

More specifically, the support member 80 is formed of, for example, stainless steel. The thickness of the support member 80 is desirably substantially equivalent to the thickness of the metal base 24. The thickness of the support member 80 is, for example, 30 μm (0.03 mm) or less and, in one example, 20 μm (0.02 mm).

When the thickness of the support member 80 is increased, the measurement temperature to be described below is lowered. For example, when the thickness of the support member 80 is 30 μm, the measured temperature is lowered by approximately 9% as compared with a case where the thickness of the support member 80 is 20 μm, but the decrease in measured temperature can be suppressed to less than 10%.

As shown in FIG. 9, the support member 80 includes a body portion 81, a plurality of extending portions 82 extending from the body portion 81 along the second face 72, fixed portions 83 connected to the extending portions 82, and an opening portion 84 (second opening portion) penetrating the body portion 81.

The support member 80 is provided such that the body portion 81 overlaps with the center of the opening portion 73 in planar view. The opening portion 84 has, for example, a circular shape. The opening portion 84 is located coaxially with the opening portion 73.

From another viewpoint, the opening portion 84 overlaps with the center of the opening portion 73. The shape of the opening portion 84 may be other shapes such as a polygonal shape. In addition, the shape of the body portion 81 is not limited to the illustrated example.

A plurality of extending portions 82 are provided substantially evenly in the circumferential direction Dθ around the body portion 81. The number of extending portions 82 is, for example, three, but may be two, or four or more. Each of the plurality of extending portions 82 has the same shape.

In the example shown in FIG. 9, the extending portions 82 are tapered in width as separated from the body portion 81 along the radial direction Dr. In this example, the width corresponds to a distance in a direction orthogonal to the radial direction Dr and the third direction D3. From another viewpoint, the extending portion 82 has a width that decreases at a constant or arbitrary rate along the radial direction Dr.

The extending portion 82 includes a proximal portion 85 connected to the body portion 81 and a distal end portion 86 on a side opposite to the proximal portion 85. The proximal portion 85 overlaps with the opening portion 73, and the distal end portion 86 overlaps with the second face 72. A width W86 (shown in FIG. 9) of the distal end portion 86 is smaller than a width W85 (shown in FIG. 9) of the proximal portion 85 (W86<W85).

The fixed portion 83 is connected to the distal end portion 86 and overlaps with the second face 72. The fixed portion 83 has, for example, an approximately rectangular shape, but is not limited to this example. In the example shown in FIG. 9, the width W83 of the fixed portion 83 is larger than the width W86 of the distal end portion 86 and larger than the width W85 of the proximal portion 85 (W83>W86 and W83>W85).

The type of thermocouple 51 can be appropriately changed according to the temperature range to be measured. The thermocouple 51 is, for example, a K thermocouple. The thermocouple 51 is inserted into the opening portions 63 and 73 along the third direction D3. The thermocouple 51 includes metal wires 53 and 54 and a measuring portion 55 formed by the metal wires 53 and 54.

The measuring portion 55 is a measuring contact (temperature measuring contact and thermal contact). The measuring portion 55 is formed by electrically connecting each of the metal wires 53 and 54 at one end. Each of the ends of the metal wires 53 and 54 on a side opposite to the measuring portion 55 is electrically connected to the measuring module 52.

The measuring module 52 measures the temperature, based on a thermoelectromotive force generated by the thermocouple 51. The measuring module 52 is, as an example, a data logger. A compensation conductor may be provided between the measuring module 52 and the metal wires 53 and 54.

In the example shown in FIG. 10, the measuring portion 55 is located at the opening portion 84 of the body portion 81. From another viewpoint, the measuring portion 55 is covered with an inner surface 87 of the opening portion 84 (shown in FIG. 10). Incidentally, the measuring portion 55 may be located above the opening portion 84 or below the opening portion 84.

The temperature measuring unit 50 further comprises adhesives 33 and 34. The adhesives 33 and 34 are, for example, thermosetting adhesives. The adhesives 33 and 34 are formed of, for example, the same material as that of the above-described adhesive 31.

The adhesive 33 secures the measuring portion 55 to the opening portion 84. In the example shown in FIG. 9, the adhesive 33 includes a first part 331 located at the opening portion 84, a second part 332 located above the opening portion 84, and a third part 333 located below the opening portion 84. Incidentally, the adhesive 33 may not include the second part 332 and the third part 333. In FIG. 9, the adhesive 33 is shown with dots.

The adhesive 34 adheres the base 70 to the support member 80. The adhesive 34 is provided between the base 70 and the fixed portion 83. The support member 80 can be stably fixed to the base 70 by fixing the fixed portion 83 having a width greater than the width W86 of the distal end portion 86 to the base 70 with the adhesive 34.

However, the adhesive 34 may be provided between the base 70 and the distal end portion 86. In the example shown in FIG. 10, a gap is formed between the base 70 and the support member 80 for convenience of description, but the gap is a minute gap and the base 70 and the support member 80 may be in contact with each other.

Next, a relationship between the temperature measuring unit 50 and the infrared irradiation device 130 will be described.

As shown in FIG. 8, the irradiation head 131 of the infrared irradiation device 130 is provided above the thermocouple unit 60. A tip 133 of the irradiation head 131 is separated from an upper surface of the support member 80 by a distance H (shown in FIG. 8) in the third direction D3.

The distance H is substantially equal to the distance from the tip 133 of the irradiation head 131 to the workpiece W in the manufacturing process of the suspension 10 (step S7). The distance H is, for example, approximately 3.0 mm.

The distance H is adjusted to be substantially equal to the distance from the tip 133 of the irradiation head 131 to the workpiece W in step S7, by the fixing stand 61, the base 70, and the like. The measurement temperature equivalent to that in the case using the workpiece W can be obtained by thus setting the distance H.

FIG. 9 shows an area A where 90% of the irradiation energy reaches, of the irradiation area of the infrared rays irradiated from the irradiation head 131. The thermocouple unit 60 is arranged such that the axis CX corresponds to the center of the irradiation head 131 (center of area A).

In planar view, the size of the opening portion 73 is desirably larger than the size of the area A. The body portion 81 and the proximal portion of the extending portion 82 overlap with the area A, but the distal end portion 86 of the extending portion 82, the fixed portion 83, and the second face 72 of the base 70 do not overlap with the area A.

An inner diameter ID of the opening portion 73 (shown in FIG. 10) is, for example, 2.0 mm or larger and, in one example, approximately 3.0 mm. The inner diameter ID of the opening portion 73 may be larger than 3.0 mm. Since the size of the area A depends on the infrared irradiation device 130 and the distance H, the size of the opening portion 73 is adjusted appropriately to be larger than the size of area A.

A relationship between the area A and the actuator mounted portions 13 and 14 will be described. FIG. 11 is a view illustrating a relationship between the actuator mounted portions 13 and 14 of the workpiece W and the infrared irradiation area. The workpiece W includes a pair of actuator mounted portions 13 and 14.

When the workpiece W is transported to the irradiation position RP and comes face to face with the tip 133 of the irradiation head 131, the actuator-mounted sections 13 and 14 overlap with area A of the irradiation area of the infrared irradiation device 130.

From another viewpoint, the area A is set to include each of the actuator mounted portions 13 and 14. By thus setting the area A, infrared rays can be simultaneously irradiated to the adhesive applied to each of the actuator mounted portions 13 and 14.

FIG. 12 is a graph showing a measured temperature at each output of the infrared irradiation device 130. A horizontal axis of FIG. 12 represents outputs [%] of the infrared irradiation device 130. A vertical axis of FIG. 12 represents the measured temperatures [Deg/C]. FIG. 12 shows measured temperatures C1 in a case of using the temperature measuring unit 50 and measured temperatures C2 in a case of using the workpiece W.

FIG. 12 shows a case of using the base 70 where the inner diameter ID of the opening portion 73 (shown in FIG. 10) is approximately 3.0 mm. The measured temperatures in the case of using the workpiece W were obtained in the state in which the measuring portion 55 of the thermocouple 51 was fixed near the tongue 26 between the pair of actuator mounted portions 13 and 14 of the workpiece W.

As shown in FIG. 12, it can be understood that the measured temperature increases in accordance with the increase in output of the infrared irradiation device 130. With the temperature measuring unit 50 of the present embodiment, the measured temperature equivalent to those in the case of using the workpiece W were obtained.

When the workpiece W was used and the output of the infrared irradiation device 130 was 90%, the measured temperature was varied. On the other hand, when the temperature measuring unit 50 was used, the measured temperature was hardly varied at each output of the infrared irradiation device 130 and a stable measured temperature was able to be obtained.

FIG. 13 and FIG. 14 show graphs indicating a relationship between the time and the measured temperatures. A horizontal axis in FIG. 13 and FIG. 14 indicates time [s], where zero correspond to the measurement start time. A vertical axis in FIG. 13 and FIG. 14 indicates the measurement temperatures [Deg/C].

FIG. 13 shows a case of using the base 70 in which the inner diameter ID of the opening portion 73 (shown in FIG. 10) is approximately 3.0 mm, and FIG. 14 shows a case of using the base 70 in which the inner diameter ID of the opening portion 73 is approximately 2.0 mm. The elements in the temperature measuring unit 50 other than the base 70 are configured in the same manner.

In the examples shown in FIG. 13 and FIG. 14, the infrared irradiation device 130 irradiated infrared rays with 100% output for 0.7 seconds (first time) and then irradiated infrared rays with 93% output for 0.7 seconds (second time). In FIG. 13 and FIG. 14, the temperatures at the first infrared irradiation were measured.

Each peak P1 of the measured temperature shown in FIG. 13 is greater than each peak P2 of the temperature shown in FIG. 14. Each peak P1 is located between 120 and 140 degrees in the example shown in FIG. 13, and each peak P2 is located between 80 and 100 degrees in the example shown in FIG. 14. In other words, the measured temperature decreased by making the size of the opening portion 73 smaller.

The area where the extending portion 82 and the second face 72 of the base 70 overlap becomes larger by making the size of the opening portion 73 smaller. By increasing the area where the extending portion 82 and the second face 72 of the base 70 overlap, heat can easily be dissipated from the extending portion 82 via the base 70. If heat is dissipated too much via the base 70, the measured temperature in the case of using the temperature measuring unit 50 may be lower than that in the case of irradiating infrared rays to the workpiece W.

Therefore, the size of the opening portion 73 is desirably larger than the size of the area A as described above. For example, the area where the extending portion 82 and the opening portion 73 overlap is larger than the area where the extending portion 82 and the second face 72 of the base 70 overlap. By forming such an opening portion 73, the measured temperature equivalent to that obtained in the case of irradiating infrared rays to the workpiece W can be obtained.

Figure 15:
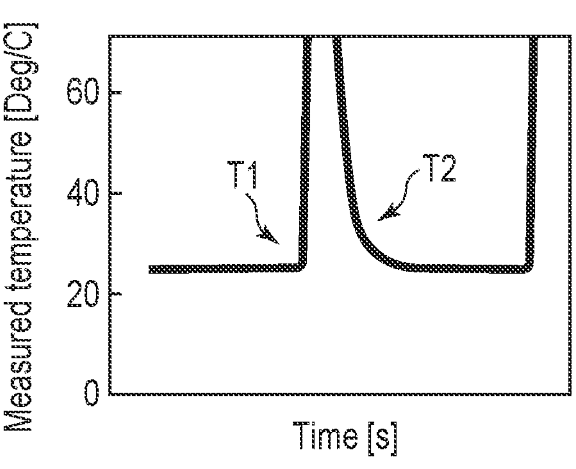
FIG. 15 is a graph showing a relationship between the time and the measured temperature.
Figure 16:
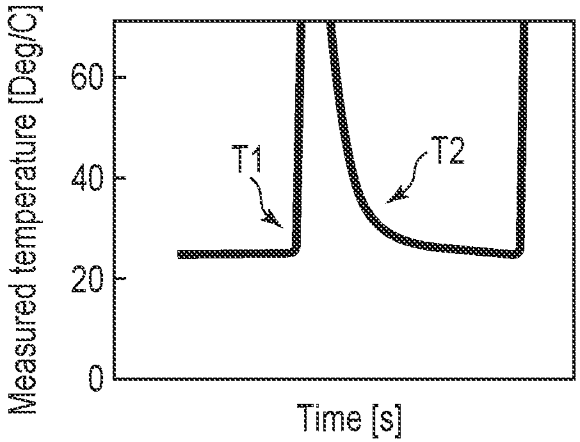
FIG. 16 is a graph showing a relationship between the time and the measured temperature.
Figure 17:
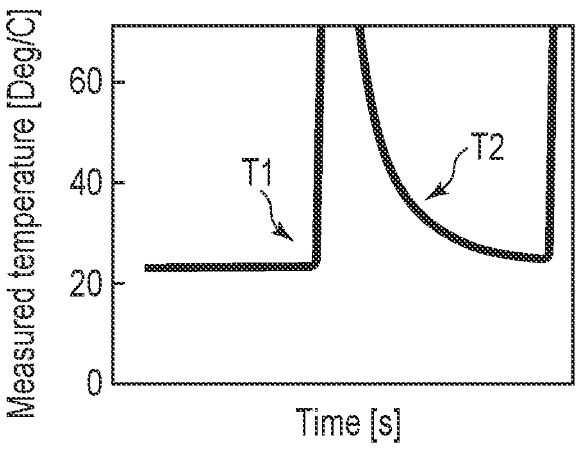
FIG. 17 is a graph showing a relationship between the time and the measured temperature.

FIG. 15 to FIG. 17 show the relationship between the time and the measured temperature. A horizontal axis in FIG. 15 to FIG. 17 indicates the time [s]. A vertical axis in FIG. 15 to FIG. 17 indicates the measured temperature [Deg/C]. In FIG. 15 to FIG. 17, a temperature rise part T1 and a temperature rise drop part T2, of the measured temperatures, are partially shown.

The measured temperatures in the case of using the temperature measuring unit 50 are shown in FIG. 15 and FIG. 16, and the measured temperatures in the case of using the workpiece W are shown in FIG. 17. FIG. 15 shows the case of using the base 70 formed of an aluminum alloy, and FIG. 16 shows the case of using the base 70 formed of PEEK.

Although not shown in the figures, peaks of the measured temperatures shown in FIG. 15 to FIG. 17 are substantially equivalent. Comparison between the temperature rise parts T1 in FIG. 15 to FIG. 17 indicates that the temperature rise parts T1 are equivalent to each other.

Comparison between the temperature drop parts T2 in FIG. 15 and FIG. 16 indicates that the temperature drop is faster in the base 70 formed of an aluminum alloy than in the base 70 formed of PEEK. From another viewpoint, heat can be dissipated more easily from the base 70 formed of an aluminum alloy than from the base 70 formed of PEEK.

When comparing each of FIG. 15 and FIG. 16 with FIG. 17 from the viewpoint of the relationship between the time and the measured temperature (temperature profile), the temperature profile equivalent to that shown in FIG. 17 was able to be obtained by using the base 70 formed of PEEK.

The temperature measuring unit 50 configured as described above comprises the support member 80 which includes the base 70 including the opening portion 73, the body portion 81 overlapping with the opening portion 73, and a plurality of extending portions 82, and the thermocouple 51 which is inserted into the opening portion 73 and which is located in the body portion 81.

For example, to measure the temperature at the irradiation position RP the using the workpiece W, the measuring portion 55 of the thermocouple 51 needs to be fixed between the pair of actuator mounted portions 13 and 14, as described with reference to FIG. 12.

In this case, the workpiece W may be deformed since the thermocouple 51 is brought into contact with the workpiece W. Furthermore, the measured temperature in the case of using the workpiece W tends to be varied and a stable measured temperature can hardly be obtained, as described with reference to FIG. 12.

In addition, a metal mesh can be used as an alternative to the workpiece W, but the metal mesh has a large heat dissipation rate and the measured temperature tends to be lower than that when infrared rays are irradiated to the workpiece W.

As described with reference to FIG. 12, the temperature measuring unit 50 of the present embodiment can obtain the measured temperature equivalent to that in the case of using the workpiece W, and can obtain the stable measured temperature with almost no variation in the measured temperature. Therefore, according to the present embodiment, the temperature measurement using the thermocouple 51 can be executed with good accuracy for infrared rays irradiated to the irradiation position RP.

The measuring portion 55 of the thermocouple 51 in the present embodiment is located in the opening portion 84 formed in the body portion 81 of the support member 80. By thus providing the measuring portion 55 relative to the support member 80, the measuring portion 55 can easily be arranged in the center of the area A when the thermocouple unit 60 is arranged at the irradiation position RP. Thus, it is possible to properly manage the positional relationship between the measuring portion 55 and the irradiation head 131, and to execute the temperature measurement using the thermocouple 51 more accurately.

Since the extending portion 82 of the present embodiment is formed in a tapered shape whose width is made smaller as separated from the body portion 81, the area where the extending portion 82 and the second face 72 of the base 70 overlap is smaller along the radial direction Dr.

Thus, heat is hardly dissipated from the extending portion 82 via the base 70. As a result, according to the temperature measuring unit 50 of the present embodiment, since a measured temperature equivalent to that in the case of using the workpiece W can be obtained, the temperature measurement can be executed using the thermocouple 51 with more accuracy.

The support member 80 of the present embodiment is formed of the same material as that for formation of the metal base 24. The support member 80 of the present embodiment has a thickness equivalent to the thickness of the metal base 24. By thus forming the support member 80, a measured temperature equivalent to that in the case of using the workpiece W can be obtained more easily.

The manufacturing apparatus 100 of the suspension 10 according to the present embodiment comprises the temperature measuring unit 50. As described above, according to the temperature measuring unit 50, a measured temperature equivalent to that in the case of using the workpiece W can be obtained. By adjusting the control parameters of the infrared irradiation device 130 based on the measured temperature, the infrared irradiation conditions of the infrared irradiation device 130 can be managed appropriately.

The infrared irradiation device 130 with appropriately controlled irradiation conditions can appropriately control the state of the applied adhesive and accurately mount the piezoelectric elements 15 and 16 at predetermined positions of the actuator mounted portions 13 and 14. As a result, the suspension 10 having stable quality can be obtained. In addition to the above-described actions, various suitable actions can be obtained from the present embodiment.

Next, the other embodiments will be described. In the other embodiments described below, the same constituent elements as those in the above-described first embodiment are denoted by the same reference numerals as those of the first embodiment and their detailed descriptions may be omitted or simplified.

Second Embodiment

Figure 18:
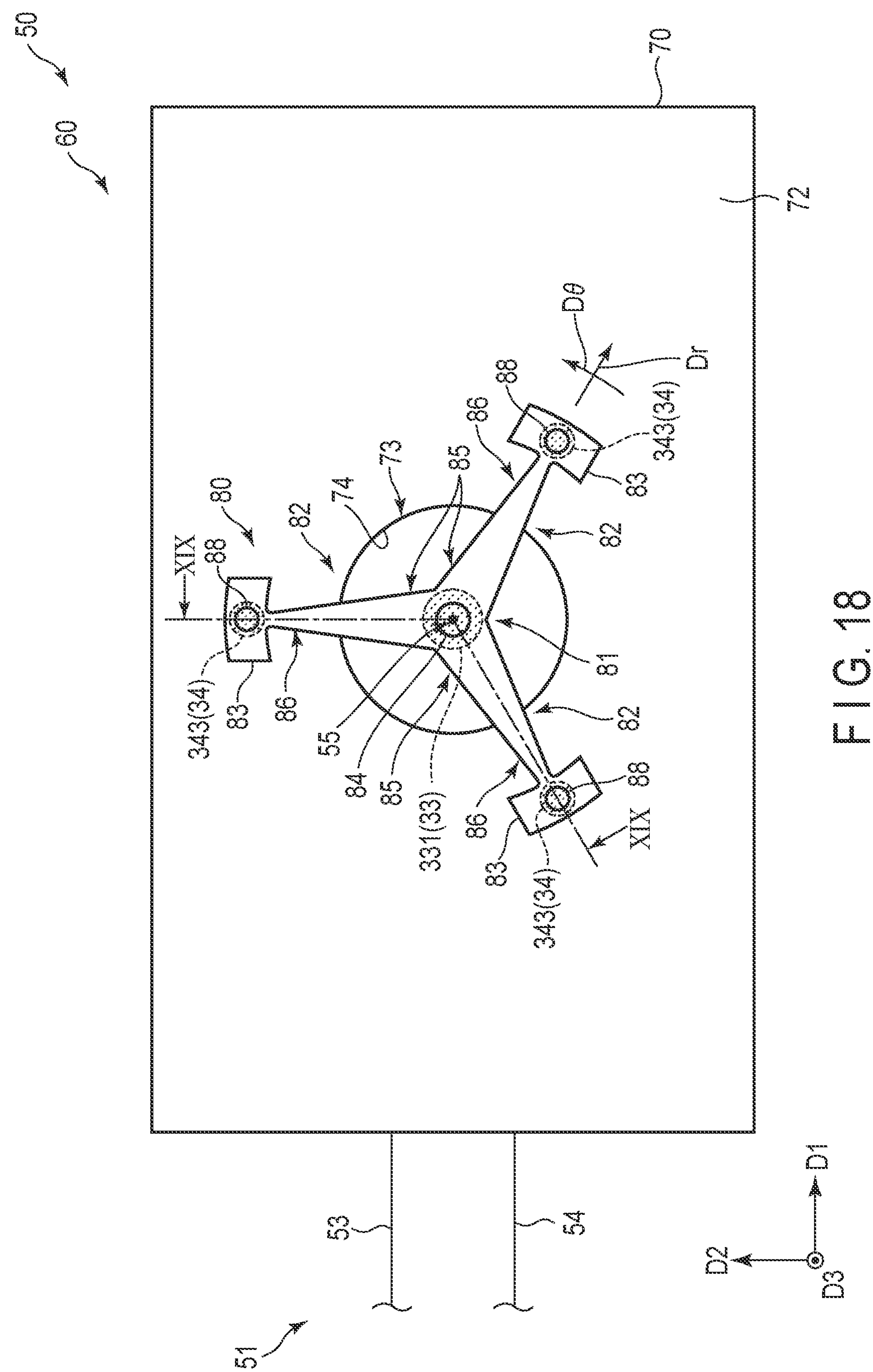
FIG. 18 is a schematic plan view showing a temperature measuring unit according to a second embodiment.

FIG. 18 is a schematic plan view showing a temperature measuring unit 50 according to a present embodiment. FIG.

19 is a schematic cross-sectional view showing a part of the temperature measuring unit 50 along line XIX-XIX line shown in FIG. 18. The temperature measuring unit 50 according to the present embodiment is different from the first embodiment in that a support member 80 includes opening portions 88 formed in fixed portions 83.

The support member 80 includes a plurality of opening portions 88 (third opening portions) penetrating the fixed portions 83. In the example shown in FIG. 18, the opening portion 88 is provided at each of the fixed portions 83. The plurality of opening portions 88 overlap with a second face 72. The opening portions 88 have, for example, a circular shape. Incidentally, the shape of the opening portion 88 may be other shapes such as a polygonal shape.

Figure 19:
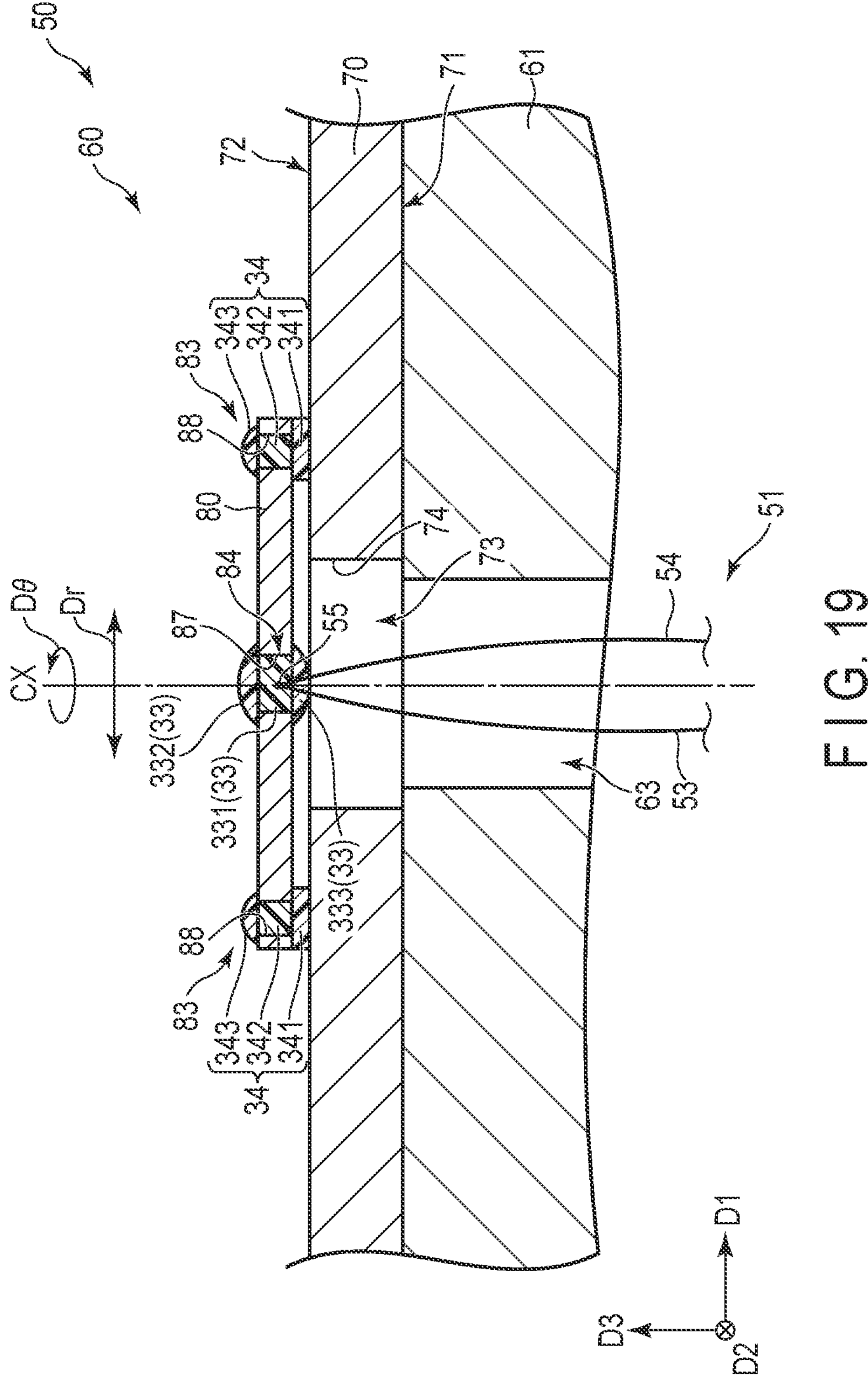
FIG. 19 is a schematic cross-sectional view showing a part of the temperature measuring unit along line XIX-XIX shown in FIG. 18.

As shown in FIG. 19, an adhesive 34 includes a fourth part 341 located between the base 70 and the fixed portion 83, a fifth part 342 located at the opening portion 88, and a sixth part 343 located above the opening portion 88. The adhesive 34 may not include the sixth part 343. In FIG. 18, the adhesives 33 and 34 are shown with dots.

In the configuration of the present embodiment, too, the same advantages as those of the first embodiment can be obtained. In the temperature measuring unit 50 according to the present embodiment, the fixed portions 83 of the support member 80 include opening portions 88. By forming the opening portions 88 in the fixed portions 83, an uncured adhesive 34 can be injected between the base 70 and the fixed portions 83 through the opening portions 88 from a direction opposite to a third direction D3, in a state in which the support member 80 is made to overlap with the base and positioned, when the support member 80 is fixed to the base 70.

Thus, the support member 80 cannot easily be shifted when the support member 80 is fixed to the base 70. Since the adhesive can be injected while the support member 80 is made to overlap with the base 70, workability in manufacturing the temperature measuring unit 50 is improved.

Third Embodiment

Figure 20:
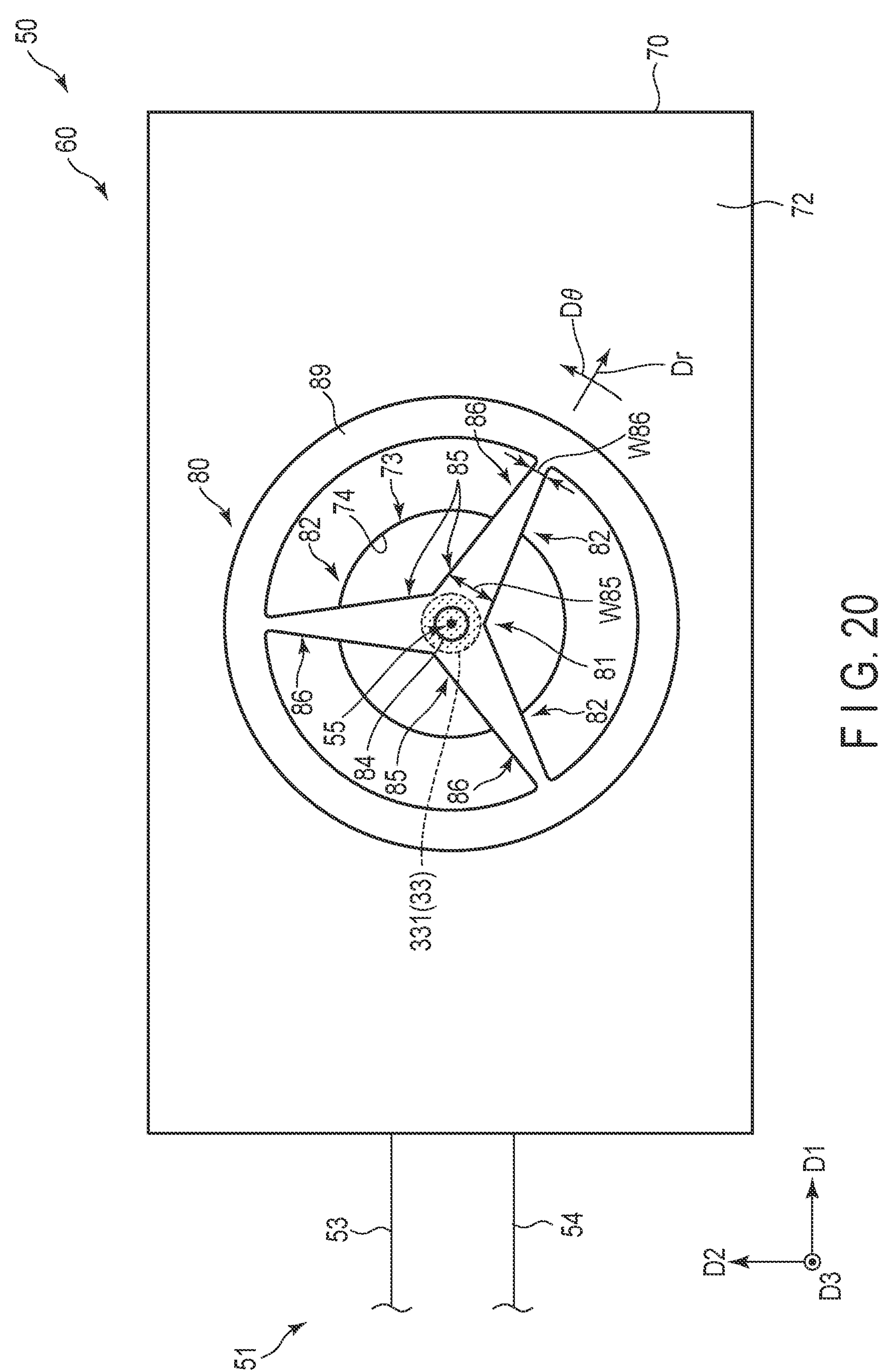
FIG. 20 is a schematic plan view showing a temperature measuring unit according to a third embodiment.

FIG. 20 is a schematic plan view showing a temperature measuring unit 50 according to a present embodiment. The temperature measuring unit 50 according to the present embodiment is different from the first embodiment in that a support member 80 includes a frame portion 89.

The support member 80 includes the frame portion 89 connected to a plurality of extending portions 82. The frame portion 89 is located outside distal end portions 86 in a radial direction Dr. The frame portion 89 overlaps with the second face 72. The frame portion 89 is formed in an annular shape in planar view. The shape of the frame portion 89 is not limited to this example.

In the present embodiment, the adhesive 34 is provided between the base 70 and the frame portion 89. For example, the adhesive is provided over the entire frame section 89 in a circumferential direction D. The adhesive 34 may be further provided between the base 70 and the distal end portions 86.

In the temperature measuring unit 50 according to the present embodiment, the support member 80 includes a frame portion 89. Thus, the support member 80 can hardly be deformed and the support member 80 can be stably fixed to the base 70. The measured temperature which is measured by the temperature measuring unit 50 is hardly changed due to presence or absence of the frame portion 89. In the configuration of the present embodiment, too, the same advantages as those of the first embodiment can be obtained.

Fourth Embodiment

Figure 21:
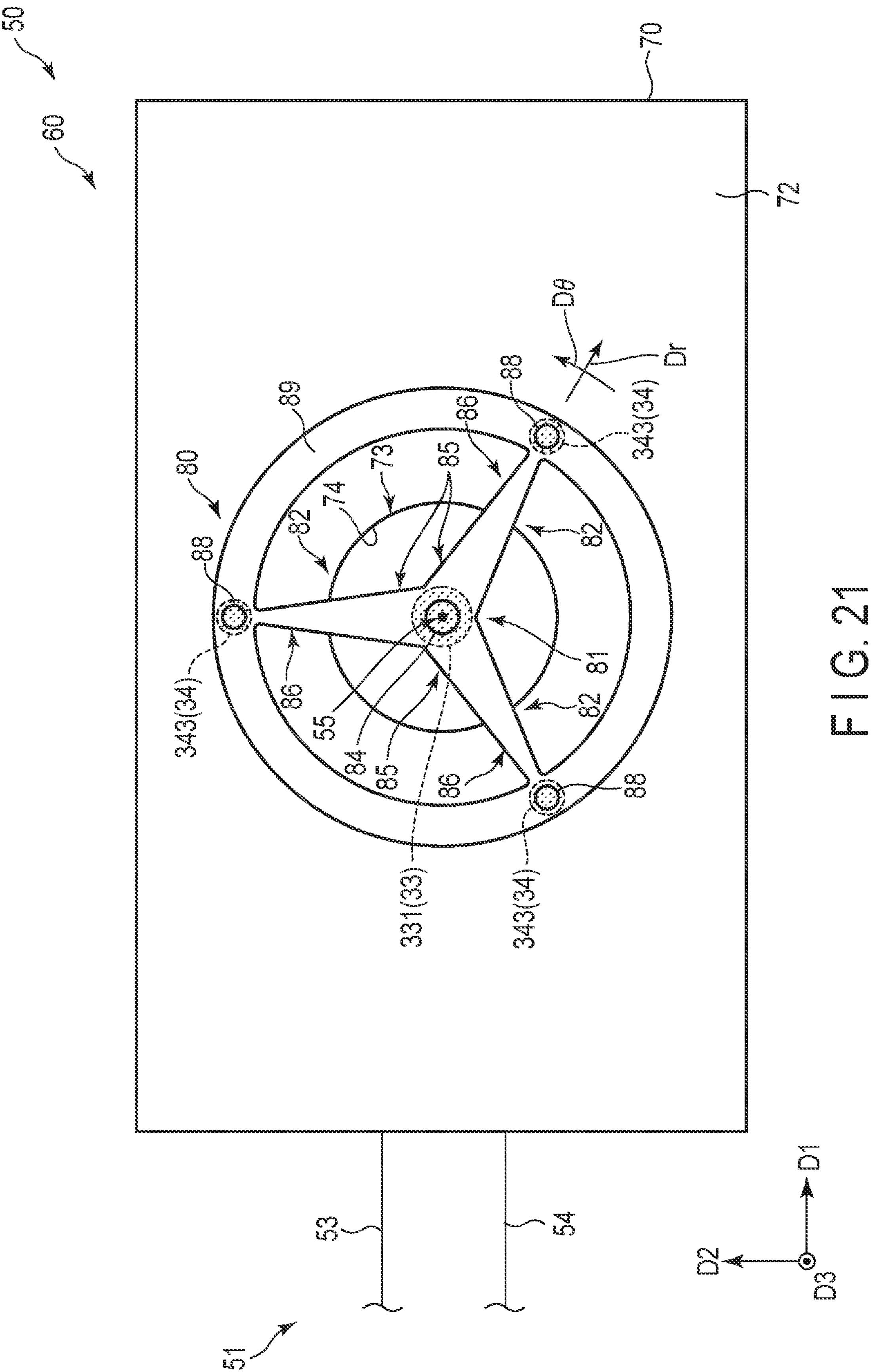
FIG. 21 is a schematic plan view showing a temperature measuring unit according to a fourth embodiment.
Figure 22:
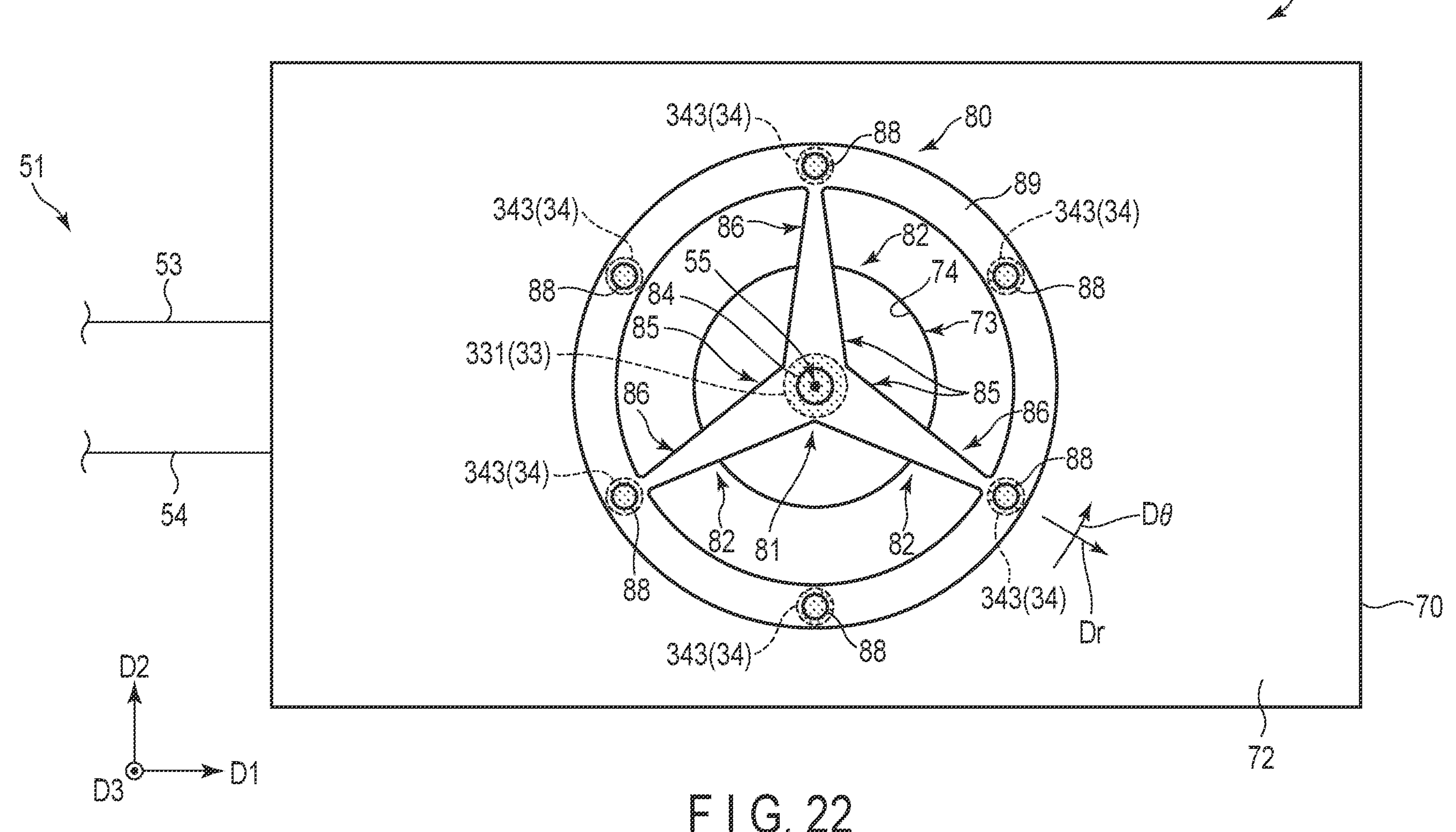
FIG. 22 is a schematic plan view showing the temperature measuring unit according to the fourth embodiment.

FIG. 21 and FIG. 22 are schematic plan views showing a temperature measuring unit 50 according to a present embodiment. The temperature measuring unit 50 according to the present embodiment is different from the third embodiment in that a support member 80 includes opening portions 88 formed in a frame portion 89. The opening portions 88 of the present embodiment have the same shape as the opening portions 88 of the second embodiment.

The support member 80 includes a plurality of opening portions 88 that penetrate the frame portion 89. The plurality of opening portions 88 overlap with a second face 72. The opening portions 88 have, for example, a circular shape. A plurality of opening portions 88 are arranged in the frame portion 89 substantially uniformly in a circumferential direction Dθ.

In the example shown in FIG. 21, three opening portions 88 are formed in the frame portion 89. In the example shown in FIG. 22, six opening portions 88 are formed in the frame portion 89. Positions of the plurality of opening portions 88 in FIG. 21 and FIG. 22 are mere examples, and are not limited to these examples.

In the present embodiment, the adhesives 34 are provided between the base 70 and the frame portion 89, at regular intervals, in the circumferential direction D. The configuration of the present embodiment is a combination of the combination of the second embodiment and the configuration of the fourth embodiment. In the configuration of the present embodiment, too, the same advantages as those of the above-described second and fourth embodiments can be obtained.

It goes without saying that the present invention disclosed in the above embodiment can be carried out by variously modifying not only specific aspects of the suspensions, but also specific aspects of the elements constituting the actuator mounted unit such as the piezoelectric elements and the adhesives. In addition, the transport device, the coating device, the infrared irradiation device, the element supply device, and the like can also be implemented in various forms.

Incidentally, in the present embodiment, a measuring portion 55 of a thermocouple 51 is fixed to an opening portion 84 by an adhesive 33, but the measuring portion 55 may be fixed to the opening portion 84 by solder. An extending portion 82 is tapered, but may be formed to have a constant width along a radial direction Dr.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A temperature measuring unit comprising:

a base including a first face, a second face on a side opposite to the first face, and a first opening portion penetrating the first face and the second face;

a support member including a body portion provided on the second face side to overlap with the first opening portion, and a plurality of extending portions extending from the body portion along the second face and overlapping with the second face; and a thermocouple inserted into the first opening portion and including a measuring portion located on the body portion, wherein the plurality of extending portions are circumferentially spaced apart around the body portion.

2. The temperature measuring unit of claim 1, wherein the support member includes a second opening portion overlapping with a center of the first opening portion and penetrating the body portion, and the measuring portion is located in the second opening portion.

3. The temperature measuring unit of claim 1, wherein each of the extending portions includes a proximal portion connected to the body portion, and a distal end portion overlapping with the second face and having a width smaller than a width of the proximal portion.

4. The temperature measuring unit of claim 3, wherein the support member further includes a fixed portion connected to the distal end portion, overlapping with the second face, and having a width greater than the distal end portion.

5. The temperature measuring unit of claim 1, wherein the support member further includes a frame portion connected to the plurality of extending portions and overlapping with the second face.

6. The temperature measuring unit of claim 1, further comprising:

adhesives bonding the base with the support member, wherein the support member further includes a plurality of third opening portions overlapping with the second face and penetrating the support member, and the adhesives are located in the third opening portions.

7. An apparatus for manufacturing a disk drive suspension comprising an actuator mounted portion on which a piezoelectric element is mounted, the apparatus comprising:

a coating device configured to apply an adhesive to the actuator mounted portion;

an infrared irradiation device configured to heat the adhesive by irradiating infrared rays to the applied adhesive;

the temperature measuring unit of claim 1 which measures a temperature at an irradiation position of the infrared rays; and a control device configured to adjust irradiation conditions of the infrared rays, based on a temperature measured by the temperature measuring unit.

8. The apparatus of claim 7, wherein the disk drive suspension includes a metal base located on the actuator mounted portion, and a material for forming the support member is the same as a material for forming the metal base.

9. The apparatus of claim 7, wherein the disk drive suspension includes a metal base located on the actuator mounted portion, and a thickness of the support member is equal to a thickness of the metal base.

10. A method of manufacturing a disk drive suspension comprising an actuator mounted portion on which a piezoelectric element is mounted, the method comprising:

applying an adhesive to the actuator mounted portion;

irradiating infrared rays to the adhesive applied to the actuator mounted portion;

arranging the temperature measuring unit of claim 1, at an irradiation position of the infrared rays irradiated to the adhesive applied to the actuator mounted portion;

irradiating the infrared rays to the temperature measuring unit;

measuring a temperature at the irradiation position by the temperature measuring unit;

adjusting irradiation conditions of the infrared rays, based on the temperature measured by the temperature measuring unit.

* * * * *